United States Patent
Park et al.

(10) Patent No.: US 10,931,353 B2
(45) Date of Patent: Feb. 23, 2021

(54) METHOD FOR TRANSMITTING OR RECEIVING CHANNEL STATE INFORMATION IN WIRELESS COMMUNICATION SYSTEM AND APPARATUS THEREFOR

(71) Applicant: LG ELECTRONICS INC., Seoul (KR)

(72) Inventors: Haewook Park, Seoul (KR); Kijun Kim, Seoul (KR); Jonghyun Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/754,281

(22) PCT Filed: Aug. 22, 2016

(86) PCT No.: PCT/KR2016/009259
§ 371 (c)(1),
(2) Date: Feb. 21, 2018

(87) PCT Pub. No.: WO2017/034270
PCT Pub. Date: Mar. 2, 2017

(65) Prior Publication Data
US 2018/0248607 A1    Aug. 30, 2018

Related U.S. Application Data

(60) Provisional application No. 62/207,946, filed on Aug. 21, 2015.

(51) Int. Cl.
*H04B 7/06* (2006.01)
*H04L 5/00* (2006.01)

(52) U.S. Cl.
CPC ............. *H04B 7/0626* (2013.01); *H04B 7/06* (2013.01); *H04B 7/0632* (2013.01); *H04L 5/005* (2013.01);
(Continued)

(58) Field of Classification Search
CPC ........................... H04B 7/0626; H04B 7/0632
See application file for complete search history.

(56) References Cited

U.S. PATENT DOCUMENTS

2012/0113812 A1   5/2012  Ji et al.
2013/0301448 A1*  11/2013  Sayana ................. H04W 24/10
                                                                    370/252
(Continued)

FOREIGN PATENT DOCUMENTS

EP          2677671         12/2013
WO       2015024519          2/2015

OTHER PUBLICATIONS

PCT International Application No. PCT/KR2016/009259, Written Opinion of the International Searching Authority dated Nov. 24, 2016, 11 pages.
(Continued)

*Primary Examiner* — Jaison Joseph
(74) *Attorney, Agent, or Firm* — Lee Hong Degerman Kang & Waimey

(57) ABSTRACT

Disclosed are a method for transmitting or receiving channel state information in a wireless communication system and an apparatus therefor. Specifically, a method for transmitting channel state information by a terminal in the wireless communication system comprises the steps of: receiving interference measurement restriction information indicating a restriction of interference measurement from a base station; deriving an interference measurement based on a channel state information-interference measurement (CSI-
(Continued)

IM) resource in only one first subframe in order to calculate a channel quality indicator (CQI); and reporting the CQI to the base station, wherein the interference restriction information may be independently set for each CSI-IM resource.

19 Claims, 12 Drawing Sheets

(52) U.S. Cl.
CPC .......... *H04L 5/0057* (2013.01); *H04L 5/0073* (2013.01); *H04L 5/0091* (2013.01)

(56) References Cited

U.S. PATENT DOCUMENTS

| | | | | |
|---|---|---|---|---|
| 2014/0010126 A1* | 1/2014 | Sayana | ................. | H04J 3/1694 370/280 |
| 2014/0044044 A1* | 2/2014 | Josiam | ................. | H04W 24/10 370/328 |
| 2014/0126402 A1* | 5/2014 | Nam | ..................... | H04W 24/08 370/252 |
| 2015/0200754 A1* | 7/2015 | Sayana | ................. | H04B 7/024 370/329 |
| 2016/0105817 A1* | 4/2016 | Frenne | ..................... | H04L 5/00 370/252 |
| 2016/0134352 A1* | 5/2016 | Stirling-Gallacher | ....................... H04B 7/0639 370/329 |
| 2016/0157218 A1* | 6/2016 | Nam | .................... | H04B 7/0456 370/329 |
| 2016/0353424 A1* | 12/2016 | Stirling-Gallacher | ....................... H04B 7/0626 |
| 2017/0033912 A1* | 2/2017 | Onggosanusi | ....... | H04B 7/0626 |
| 2017/0047978 A1* | 2/2017 | Kim | .................... | H04B 7/0626 |

OTHER PUBLICATIONS

Nokia Networks, "Measurement restrictions for CSI-RS and IMR," 3GPP TSG-RAN WG1 #82, R1-154518, Aug. 2015, 6 pages.

* cited by examiner

[FIG. 1]
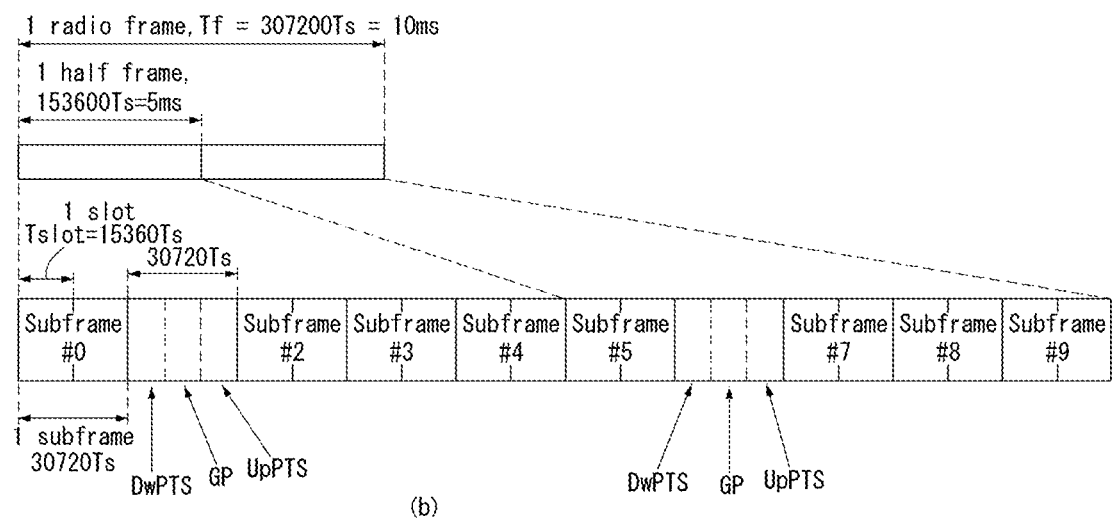

[FIG. 2]
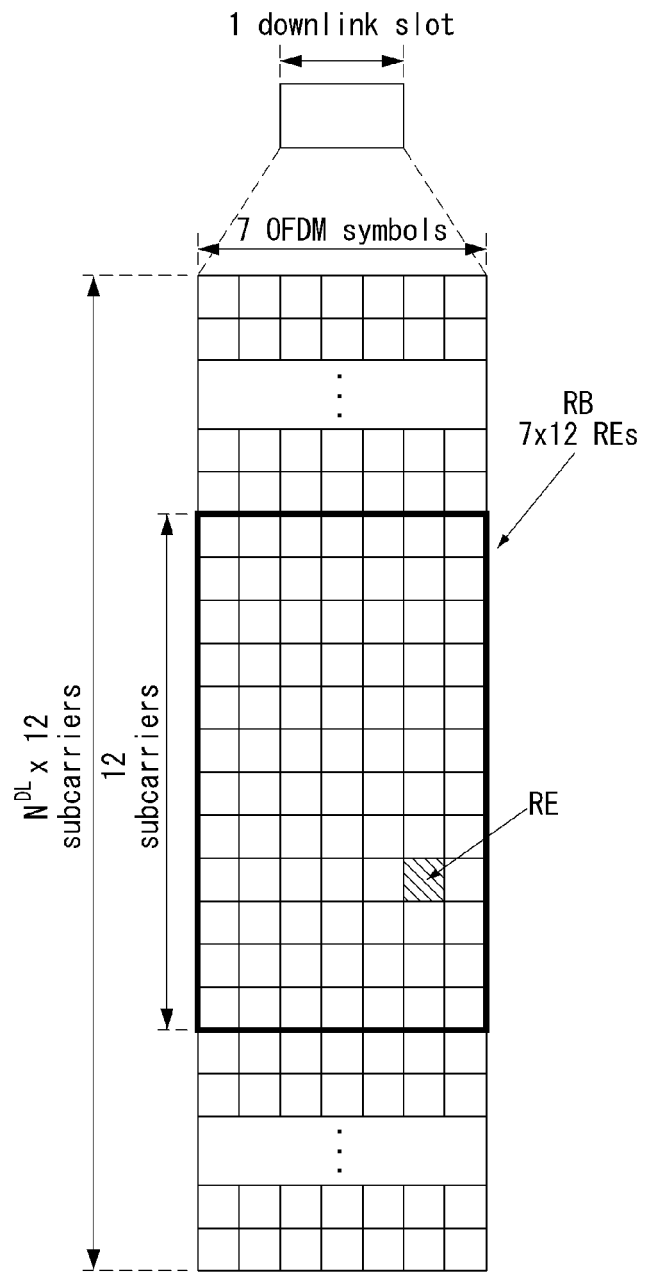

【FIG. 3】
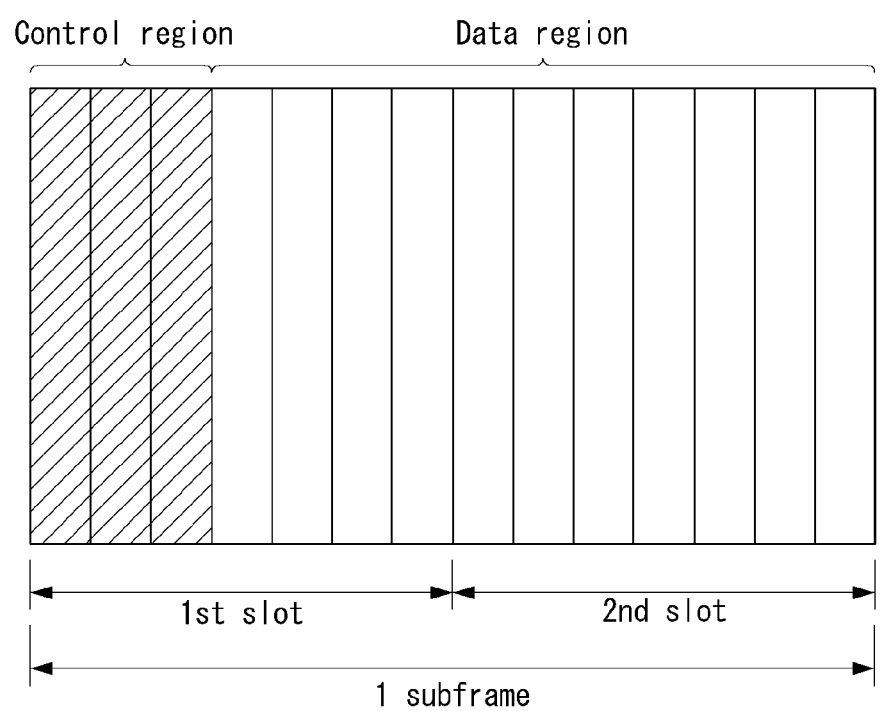

[FIG. 4]
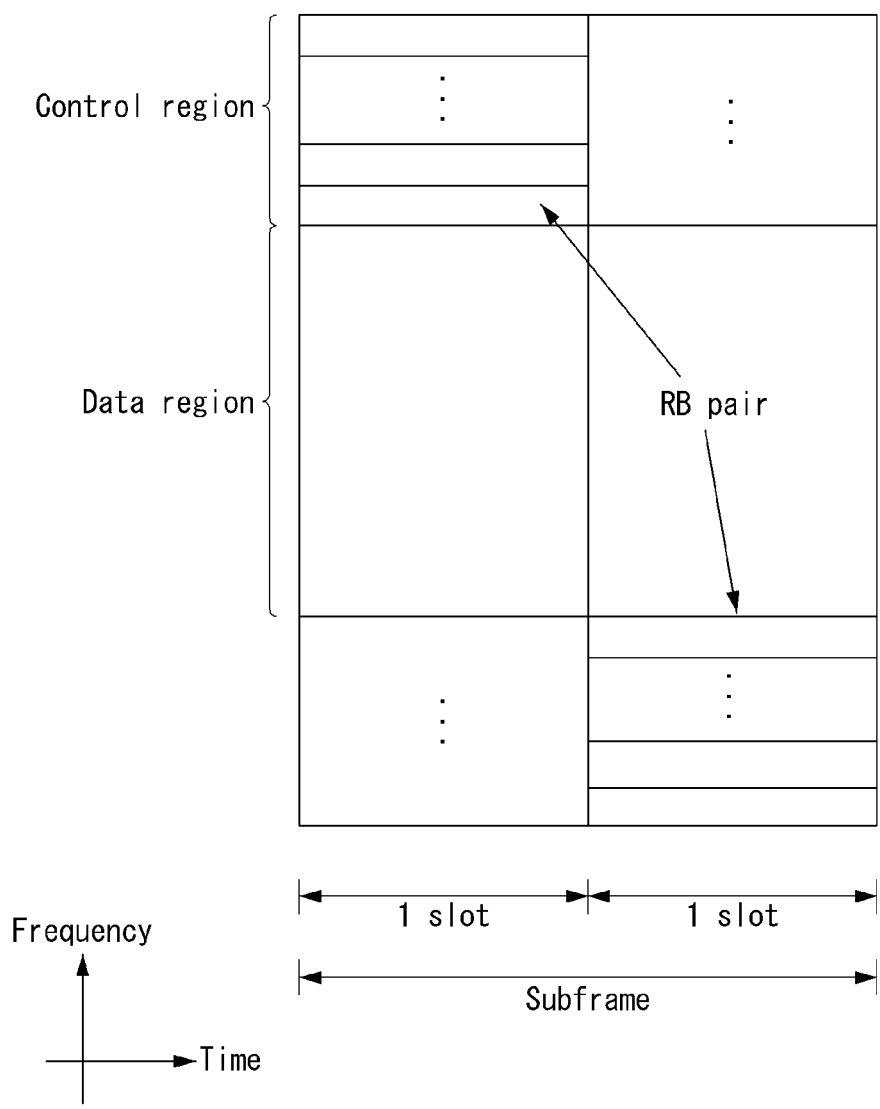

[FIG. 5]
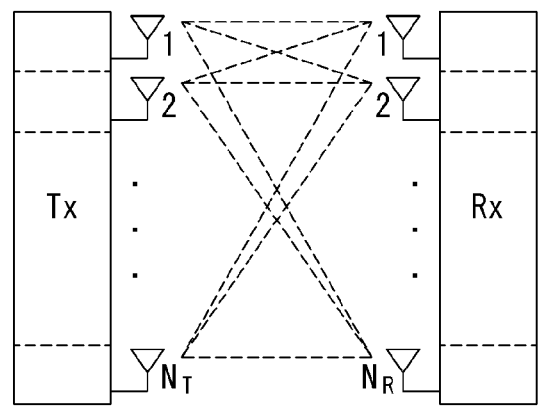
[FIG. 6]
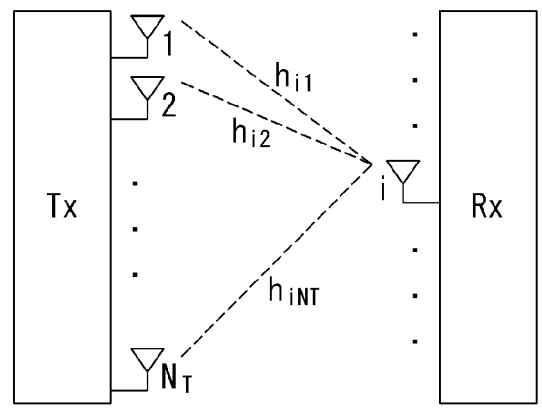

[FIG. 7]
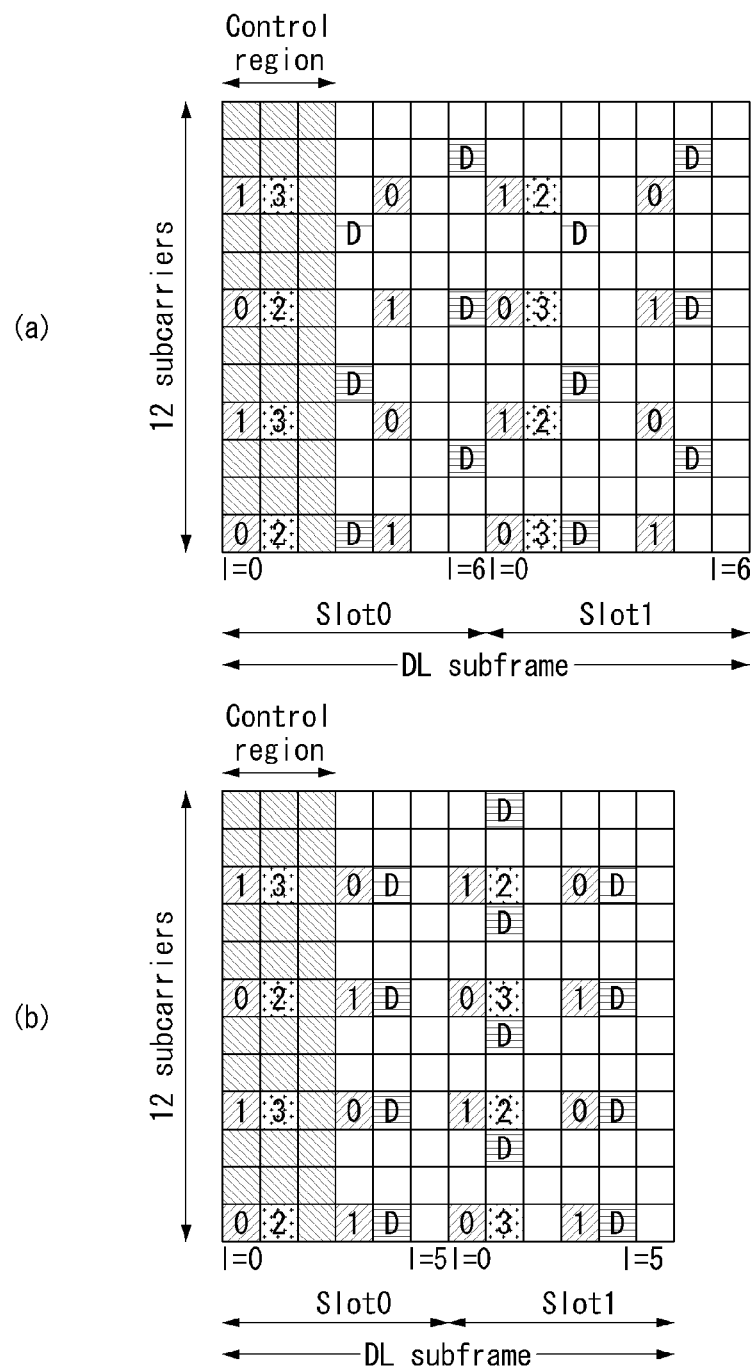

[FIG. 8]
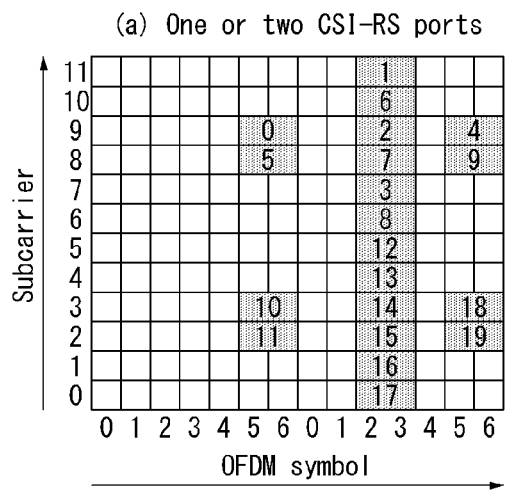
(a) One or two CSI-RS ports
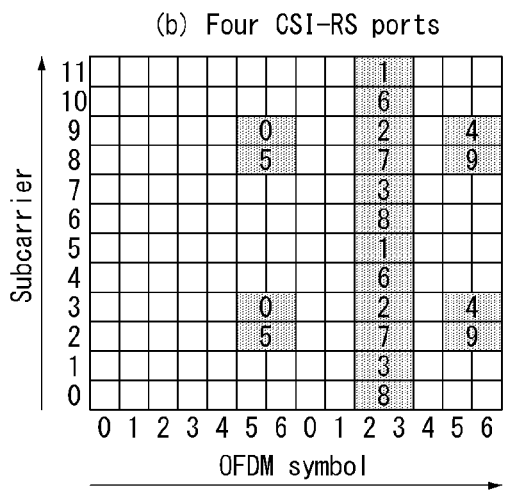
(b) Four CSI-RS ports
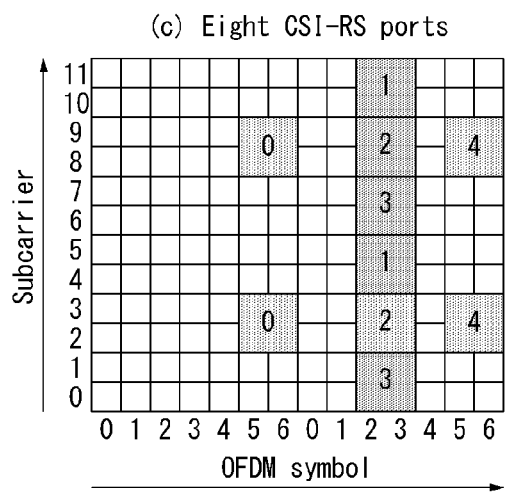
(c) Eight CSI-RS ports 【FIG. 9】
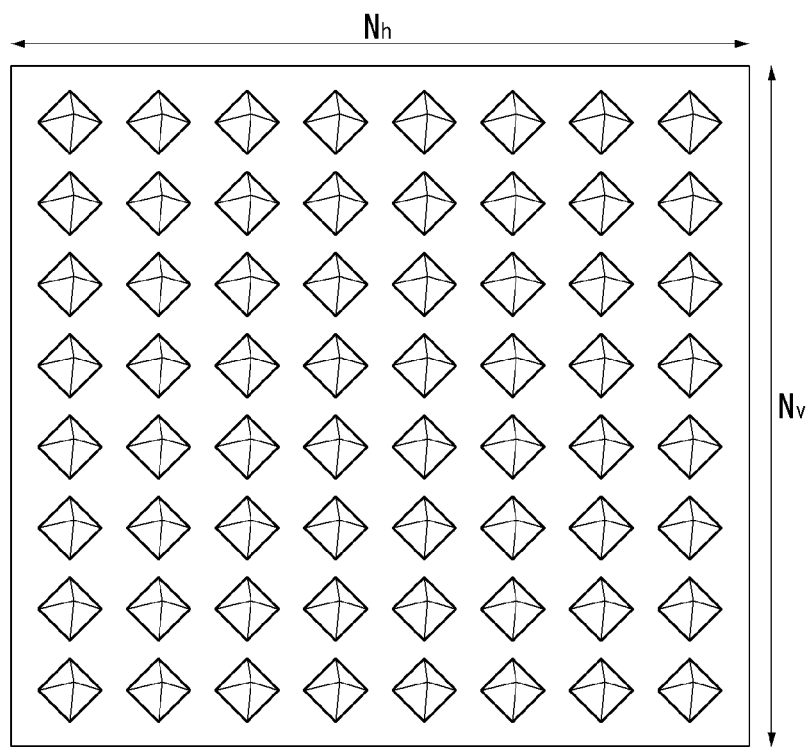

[FIG. 10]
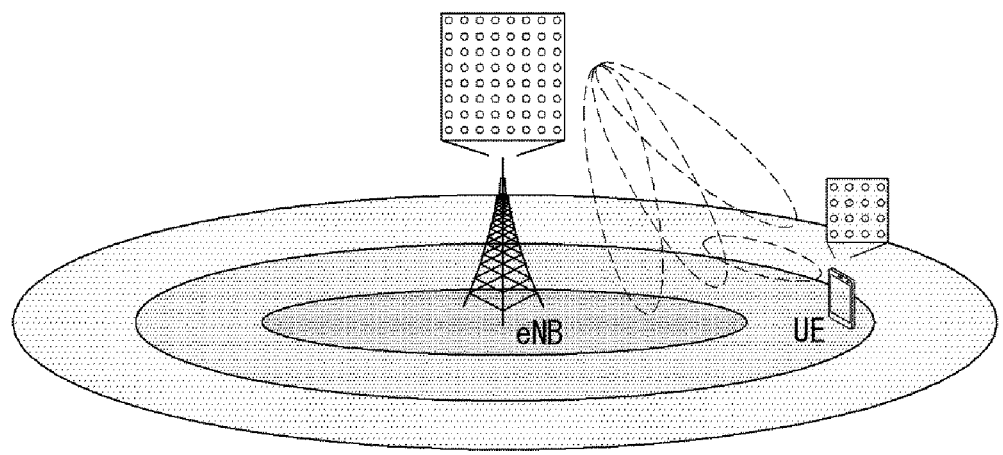

[FIG. 11]
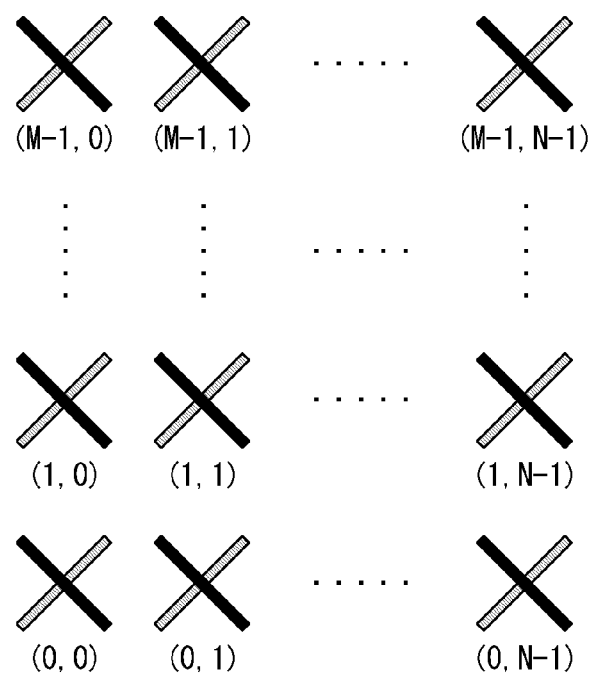

【FIG. 12】
(a) 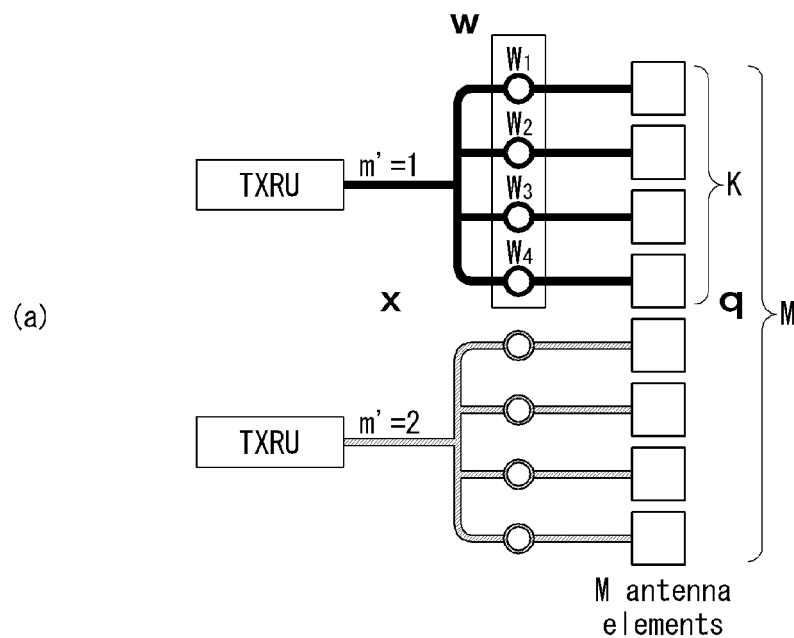
(b) 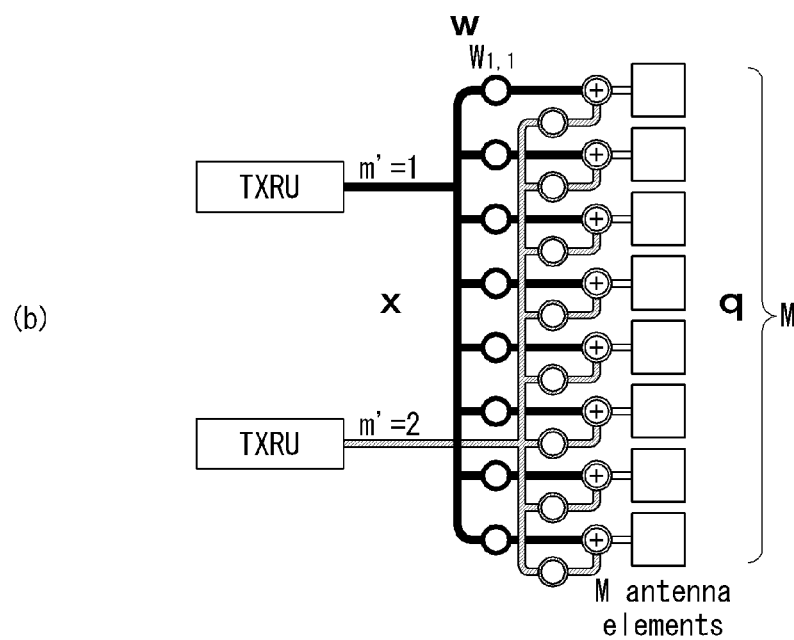

【FIG. 13】
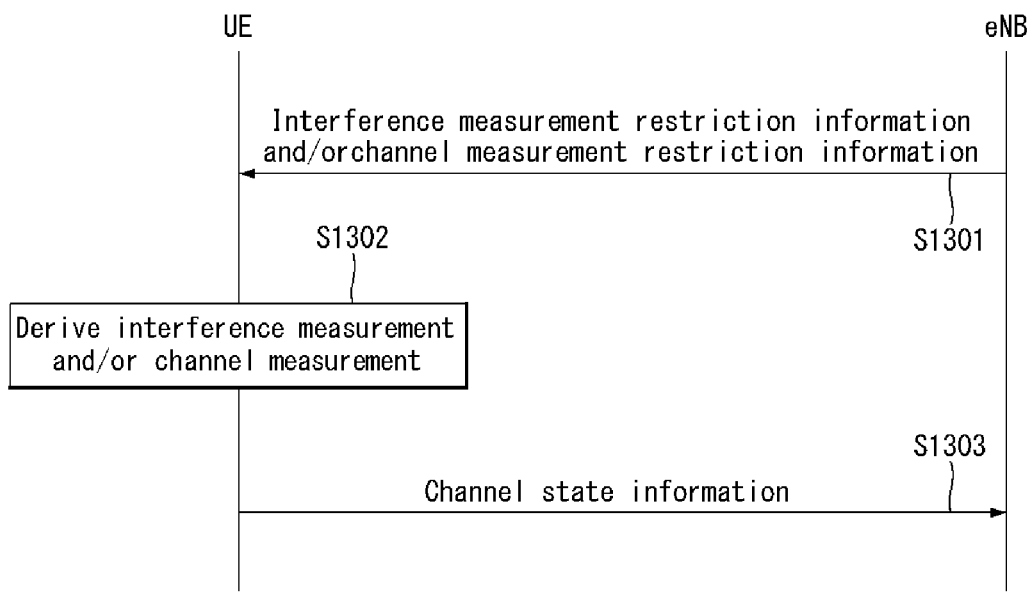
【FIG. 14】
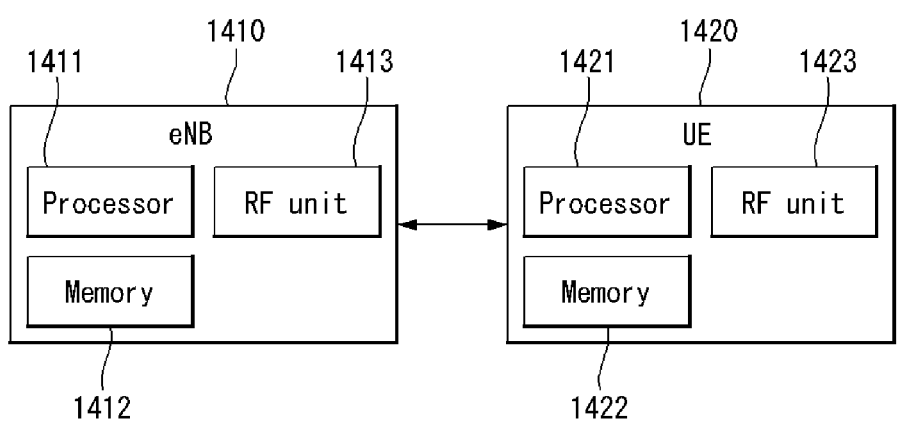

METHOD FOR TRANSMITTING OR RECEIVING CHANNEL STATE INFORMATION IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2016/009259, filed on Aug. 22, 2016, which claims the benefit of U.S. Provisional Application No. 62/207,946, filed on Aug. 21, 2015, the contents of which are all hereby incorporated by reference herein in its entirety.

TECHNICAL FIELD

The present invention relates to a wireless communication system, and more specifically, to a method for transmitting and receiving channel state information and an apparatus therefor.

BACKGROUND ART

Mobile communication systems have been developed to provide voice services, while guaranteeing user activity. Service coverage of mobile communication systems, however, has extended even to data services, as well as voice services, and currently, an explosive increase in traffic has resulted in shortage of resource and user demand for a high speed services, requiring advanced mobile communication systems.

The requirements of the next-generation mobile communication system may include supporting huge data traffic, a remarkable increase in the transfer rate of each user, the accommodation of a significantly increased number of connection devices, very low end-to-end latency, and high energy efficiency. To this end, various techniques, such as small cell enhancement, dual connectivity, massive Multiple Input Multiple Output (MIMO), in-band full duplex, non-orthogonal multiple access (NOMA), supporting super-wide band, and device networking, have been researched.

DISCLOSURE

Technical Problem

An object of the present invention is to provide a method for transmitting and receiving channel state information.

In addition, an object of the present invention is to provide a method for restricting a channel/interference measurement interval for channel state information acquisition.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

According to one aspect of the present invention, a method for transmitting channel state information by a UE in a wireless communication system includes: receiving interference measurement restriction information indicating a restriction of interference measurement from an eNB; deriving interference measurement based on a channel state information-interference measurement (CSI-IM) resource in only one first subframe in order to calculate a channel quality indicator (CQI); and reporting the CQI to the eNB, wherein the interference restriction information is independently set for each CSI-IM resource.

According to another aspect of the present invention, a UE transmitting channel state information in a wireless communication system includes: a radio frequency (RF) unit for transmitting/receiving RF signals; and a processor for controlling the RF unit, wherein the processor is configured: to receive interference measurement restriction information indicating a restriction of interference measurement from an eNB; to derive interference measurement based on a channel state information-interference measurement (CSI-IM) resource in only one first subframe in order to calculate a channel quality indicator (CQI); and to report the CQI to the eNB, wherein the interference restriction information is independently set for each CSI-IM resource.

Preferably, the method may further include: receiving channel measurement restriction information indicating a restriction of channel measurement from the eNB; and deriving channel measurement based on a non-zero power (NZP) CSI-RS of channel state information-reference signal (CSI-RS) resources in only one second subframe in order to calculate a CQI.

Preferably, the channel measurement restriction information may be integrally configured for CSI-RS resources configured for the UE.

Preferably, the channel measurement restriction information may be independently configured for each CSI-RS resource configured for the UE.

Preferably, in the case of aperiodic CSI reporting, the one second subframe may be a subframe in which a CSI request is transmitted to the UE.

Preferably, in the case of periodic CSI reporting, the one second subframe may be a CSI reference resource according to a periodic CSI reporting operation.

Preferably, in the case of periodic CSI reporting, when CSI-RS resource indicator (CRI) reporting is configured, a CRI reporting period may be configured to be longer than a rank indicator (RI) reporting period.

Preferably, when CRI reporting is configured, the CQI, a precoding matrix indicator (PMI), and a rank indicator (RI) may be derived under the condition of the CRI.

Preferably, in the case of periodic CSI reporting, when CRI reporting is configured, a CRI reporting period may be configured to be the same as an RI reporting period.

Preferably, the CRI and the RI may be jointly encoded.

Advantageous Effects

According to embodiments of the present invention, channel/interference measurement performance can be improved by restricting a channel/interference measurement window.

Furthermore, according to embodiments of the present invention, channel/interference measurement performance can be improved by restricting a channel/interference measurement window when a method of transmitting a CSI-RS using different beamforming methods in the time domain is considered.

The effects that can be achieved with the present invention are not limited to what has been particularly described hereinabove and can be inferred from embodiments of the present invention.

DESCRIPTION OF DRAWINGS

The accompanying drawings, which are included herein as a part of the description for help understanding the present invention, provide embodiments of the present invention, and describe the technical features of the present invention with the description below.

FIG. 1 illustrates the structure of a radio frame in a wireless communication system to which the present invention may be applied.

FIG. 2 is a diagram illustrating a resource grid for a downlink slot in a wireless communication system to which the present invention may be applied.

FIG. 3 illustrates a structure of downlink subframe in a wireless communication system to which the present invention may be applied.

FIG. 4 illustrates a structure of uplink subframe in a wireless communication system to which the present invention may be applied.

FIG. 5 shows the configuration of a known MIMO communication system.

FIG. 6 is a diagram showing a channel from a plurality of transmission antennas to a single reception antenna.

FIG. 7 illustrates reference signal patterns mapped to downlink resource block pairs in a wireless communication system to which the present invention may be applied.

FIG. 8 is a diagram illustrating resources to which reference signals are mapped in a wireless communication system to which the present invention may be applied.

FIG. 9 illustrates a 2D-AAS having 64 antenna elements in a wireless communication system to which the present invention may be applied.

FIG. 10 illustrates a system in which an eNB or UE has a plurality of transmission/reception antennas capable of forming a 3D beam based on the AAS in a wireless communication system to which the present invention may be applied.

FIG. 11 illustrates a 2D antenna system having cross-polarizations in a wireless communication system to which the present invention may be applied.

FIG. 12 illustrates a transceiver unit model in a wireless communication system to which the present invention may be applied.

FIG. 13 illustrates a method for transmitting and receiving channel state information according to one embodiment of the present invention.

FIG. 14 is a block diagram of a wireless communication apparatus according to one embodiment of the present invention.

MODE FOR INVENTION

Some embodiments of the present invention are described in detail with reference to the accompanying drawings. A detailed description to be disclosed along with the accompanying drawings are intended to describe some embodiments of the present invention and are not intended to describe a sole embodiment of the present invention. The following detailed description includes more details in order to provide full understanding of the present invention. However, those skilled in the art will understand that the present invention may be implemented without such more details.

In some cases, in order to avoid that the concept of the present invention becomes vague, known structures and devices are omitted or may be shown in a block diagram form based on the core functions of each structure and device.

In this specification, a base station has the meaning of a terminal node of a network over which the base station directly communicates with a device. In this document, a specific operation that is described to be performed by a base station may be performed by an upper node of the base station according to circumstances. That is, it is evident that in a network including a plurality of network nodes including a base station, various operations performed for communication with a device may be performed by the base station or other network nodes other than the base station. The base station (BS) may be substituted with another term, such as a fixed station, a Node B, an eNB (evolved-NodeB), a Base Transceiver System (BTS), or an access point (AP). Furthermore, the device may be fixed or may have mobility and may be substituted with another term, such as User Equipment (UE), a Mobile Station (MS), a User Terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, or a Device-to-Device (D2D) device.

Hereinafter, downlink (DL) means communication from an eNB to UE, and uplink (UL) means communication from UE to an eNB. In DL, a transmitter may be part of an eNB, and a receiver may be part of UE. In UL, a transmitter may be part of UE, and a receiver may be part of an eNB.

Specific terms used in the following description have been provided to help understanding of the present invention, and the use of such specific terms may be changed in various forms without departing from the technical sprit of the present invention.

The following technologies may be used in a variety of wireless communication systems, such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and Non-Orthogonal Multiple Access (NOMA). CDMA may be implemented using a radio technology, such as Universal Terrestrial Radio Access (UTRA) or CDMA2000. TDMA may be implemented using a radio technology, such as Global System for Mobile communications (GSM)/General Packet Radio Service (GPRS)/Enhanced Data rates for GSM Evolution (EDGE). OFDMA may be implemented using a radio technology, such as Institute of Electrical and Electronics Engineers (IEEE) 802.11 (Wi-Fi), IEEE 802.16 (WiMAX), IEEE 802.20, or Evolved UTRA (E-UTRA). UTRA is part of a Universal Mobile Telecommunications System (UMTS). 3rd Generation Partnership Project (3GPP) Long Term Evolution (LTE) is part of an Evolved UMTS (E-UMTS) using evolved UMTS Terrestrial Radio Access (E-UTRA), and it adopts OFDMA in downlink and adopts SC-FDMA in uplink. LTE-Advanced (LTE-A) is the evolution of 3GPP LTE.

Embodiments of the present invention may be supported by the standard documents disclosed in at least one of IEEE 802, 3GPP, and 3GPP2, that is, radio access systems. That is, steps or portions that belong to the embodiments of the present invention and that are not described in order to clearly expose the technical spirit of the present invention may be supported by the documents. Furthermore, all terms disclosed in this document may be described by the standard documents.

In order to more clarify a description, 3GPP LTE/LTE-A is chiefly described, but the technical characteristics of the present invention are not limited thereto.

General System to which the Present Invention May be Applied

FIG. 1 shows the structure of a radio frame in a wireless communication system to which an embodiment of the present invention may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of $T\_s=1/(15000*2048)$. A UL and DL transmission includes the radio frame having a duration of $T\_f=307200*T\_s=10$ ms.

FIG. 1(a) exemplifies a radio frame structure type 1. The type 1 radio frame may be applied to both of full duplex FDD and half duplex FDD.

A radio frame includes 10 subframes. A radio frame includes 20 slots of $T\_slot=15360*T\_s=0.5$ ms length, and 0 to 19 indexes are given to each of the slots. One subframe includes consecutive two slots in the time domain, and subframe i includes slot $2i$ and slot $2i+1$. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a UE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

FIG. 1(b) shows frame structure type 2.

A type 2 radio frame includes two half frame of $153600*T\_s=5$ ms length each. Each half frame includes 5 subframes of $30720*T\_s=1$ ms length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |

TABLE 1-continued

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for a DL transmission, 'U' represents a subframe for UL transmission, and 'S' represents a special subframe including three types of fields including a Downlink Pilot Time Slot (DwPTS), a Guard Period (GP), and a Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot $2i$ and slot $2i+1$ of $T\_slot=15360*T\_s=0.5$ ms.

The UL-DL configuration may be classified into 7 types, and the position and/or the number of a DL subframe, a special subframe and a UL subframe are different for each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 represents configuration (length of DwPTS/GP/UpPTS) of a special subframe.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |

TABLE 2-continued

| | Normal cyclic prefix in downlink | | | Extended cyclic prefix in downlink | | |
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
|---|---|---|---|---|---|---|
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

The structure of a radio subframe according to the example of FIG. 1 is just an example, and the number of subcarriers included in a radio frame, the number of slots included in a subframe and the number of OFDM symbols included in a slot may be changed in various manners.

FIG. 2 is a diagram illustrating a resource grid for one downlink slot in a wireless communication system to which an embodiment of the present invention may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the present invention is not limited thereto.

Each element on the resource grid is referred to as a resource element, and one resource block (RB) includes 12×7 resource elements. The number of RBs N^DL included in a downlink slot depends on a downlink transmission bandwidth.

The structure of an uplink slot may be the same as that of a downlink slot.

FIG. 3 shows the structure of a downlink subframe in a wireless communication system to which an embodiment of the present invention may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific UE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs.

A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

FIG. 4 shows the structure of an uplink subframe in a wireless communication system to which an embodiment of the present invention may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Multi-Input Multi-Output (MIMO)

A MIMO technology does not use single transmission antenna and single reception antenna that have been commonly used so far, but uses a multi-transmission (Tx) antenna and a multi-reception (Rx) antenna. In other words, the MIMO technology is a technology for increasing a capacity or enhancing performance using multi-input/output antennas in the transmission end or reception end of a wireless communication system. Hereinafter, MIMO is called a "multi-input/output antenna.".

More specifically, the multi-input/output antenna technology does not depend on a single antenna path in order to receive a single total message and completes total data by collecting a plurality of data pieces received through several antennas. As a result, the multi-input/output antenna technology can increase a data transfer rate within a specific system range and can also increase a system range through a specific data transfer rate.

It is expected that an efficient multi-input/output antenna technology will be used because next-generation mobile communication requires a data transfer rate much higher than that of existing mobile communication. In such a situation, the MIMO communication technology is a next-generation mobile communication technology which may be widely used in mobile communication UE and a relay node and has been in the spotlight as a technology which may overcome a limit to the transfer rate of another mobile communication attributable to the expansion of data communication.

Meanwhile, the multi-input/output antenna (MIMO) technology of various transmission efficiency improvement technologies that are being developed has been most in the spotlight as a method capable of significantly improving a communication capacity and transmission/reception performance even without the allocation of additional frequencies or a power increase.

FIG. 5 shows the configuration of a known MIMO communication system.

Referring to FIG. 5, if the number of transmission (Tx) antennas is increased to N_T and the number of reception (Rx) antennas is increased to N_R at the same time, a theoretical channel transmission capacity is increased in proportion to the number of antennas, unlike in the case where a plurality of antennas is used only in a transmitter or a receiver. Accordingly, a transfer rate can be improved, and frequency efficiency can be significantly improved. In this case, a transfer rate according to an increase of a channel transmission capacity may be theoretically increased by a value obtained by multiplying the following rate increment R_i by a maximum transfer rate R_o if one antenna is used.

$$R_i = \min(N_T, N_R)$$ [Equation 1]

That is, in an MIMO communication system using 4 transmission antennas and 4 reception antennas, for example, a quadruple transfer rate can be obtained theoretically compared to a single antenna system.

Such a multi-input/output antenna technology may be divided into a spatial diversity method for increasing transmission reliability using symbols passing through various channel paths and a spatial multiplexing method for improving a transfer rate by sending a plurality of data symbols at the same time using a plurality of transmission antennas. Furthermore, active research is being recently carried out on a method for properly obtaining the advantages of the two methods by combining the two methods.

Each of the methods is described in more detail below.

First, the spatial diversity method includes a space-time block code-series method and a space-time Trelis code-series method using a diversity gain and a coding gain at the same time. In general, the Trelis code-series method is better in terms of bit error rate improvement performance and the degree of a code generation freedom, whereas the space-time block code-series method has low operational complexity. Such a spatial diversity gain may correspond to an amount corresponding to the product (N_T×N_R) of the number of transmission antennas (N_T) and the number of reception antennas (N_R).

Second, the spatial multiplexing scheme is a method for sending different data streams in transmission antennas. In this case, in a receiver, mutual interference is generated between data transmitted by a transmitter at the same time. The receiver removes the interference using a proper signal processing scheme and receives the data. A noise removal method used in this case may include a Maximum Likelihood Detection (MLD) receiver, a Zero-Forcing (ZF) receiver, a Minimum Mean Square Error (MMSE) receiver, Diagonal-Bell Laboratories Layered Space-Time (D-BLAST), and Vertical-Bell Laboratories Layered Space-Time (V-BLAST). In particular, if a transmission end can be aware of channel information, a Singular Value Decomposition (SVD) method may be used.

Third, there is a method using a combination of a spatial diversity and spatial multiplexing. If only a spatial diversity gain is to be obtained, a performance improvement gain according to an increase of a diversity disparity is gradually saturated. If only a spatial multiplexing gain is used, transmission reliability in a radio channel is deteriorated. Methods for solving the problems and obtaining the two gains have been researched and may include a double space-time transmit diversity (double-STTD) method and a space-time bit interleaved coded modulation (STBICM).

In order to describe a communication method in a multi-input/output antenna system, such as that described above, in more detail, the communication method may be represented as follows through mathematical modeling.

First, as shown in FIG. 5, it is assumed that N_T transmission antennas and NR reception antennas are present.'

First, a transmission signal is described below. If the N_T transmission antennas are present as described above, a maximum number of pieces of information which can be transmitted are N_T, which may be represented using the following vector.

$$s = [s_1, s_2, \ldots, s_{N_T}]^T$$ [Equation 2]

Meanwhile, transmission power may be different in each of pieces of transmission information s_1, s_2, ... s_NT. In this case, if pieces of transmission power are P_1, P_2, ..., P_NT, transmission information having controlled transmission power may be represented using the following vector.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T$$ [Equation 3]

Furthermore, transmission information having controlled transmission power in the Equation 3 may be represented as follows using the diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps$$ [Equation 4]

Meanwhile, the information vector having controlled transmission power in the Equation 4 is multiplied by a weight matrix W, thus forming N_T transmission signals x_1, x_2, . . . , x_NT that are actually transmitted. In this case, the weight matrix functions to properly distribute the transmission information to antennas according to a transport channel condition. The following may be represented using the transmission signals x_1, x_2, . . . , x_NT.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \qquad [\text{Equation 5}]$$

$$W\hat{s} = WPs$$

In this case, w_ij denotes weight between an i-th transmission antenna and a j-th transmission information, and W is an expression of a matrix of the weight. Such a matrix W is called a weight matrix or precoding matrix.

Meanwhile, the transmission signal x, such as that described above, may be considered to be used in a case where a spatial diversity is used and a case where spatial multiplexing is used.

If spatial multiplexing is used, all the elements of the information vector s have different values because different signals are multiplexed and transmitted. In contrast, if the spatial diversity is used, all the elements of the information vector s have the same value because the same signals are transmitted through several channel paths.

A method of mixing spatial multiplexing and the spatial diversity may be taken into consideration. In other words, the same signals may be transmitted using the spatial diversity through 3 transmission antennas, for example, and the remaining different signals may be spatially multiplexed and transmitted.

If N_R reception antennas are present, the reception signals y_1, y_2, . . . , y_NR of the respective antennas are represented as follows using a vector y.

$$y = [y_1, y_2, \ldots, y_{N_R}]^T \qquad [\text{Equation 6}]$$

Meanwhile, if channels in a multi-input/output antenna communication system are modeled, the channels may be classified according to transmission/reception antenna indices. A channel passing through a reception antenna i from a transmission antenna j is represented as h_ij. In this case, it is to be noted that in order of the index of h_ij, the index of a reception antenna comes first and the index of a transmission antenna then comes.

Several channels may be grouped and expressed in a vector and matrix form. For example, a vector expression is described below.

FIG. 6 is a diagram showing a channel from a plurality of transmission antennas to a single reception antenna.

As shown in FIG. 6, a channel from a total of N_T transmission antennas to a reception antenna i may be represented as follows.

$$h_i^T = [h_{i1}, h_{i2}, \ldots, h_{iN_T}] \qquad [\text{Equation 7}]$$

Furthermore, if all channels from the N_T transmission antenna to NR reception antennas are represented through a matrix expression, such as Equation 7, they may be represented as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \qquad [\text{Equation 8}]$$

Meanwhile, Additive White Gaussian Noise (AWGN) is added to an actual channel after the actual channel experiences the channel matrix H. Accordingly, AWGN, n_1, n_2, . . . , n_NR added to the N_R reception antennas, respectively, are represented using a vector as follows.

$$n = [n_1, n_2, \ldots, n_{N_R}]^T \qquad [\text{Equation 9}]$$

A transmission signal, a reception signal, a channel, and AWGN in a multi-input/output antenna communication system may be represented to have the following relationship through the modeling of the transmission signal, reception signal, channel, and AWGN, such as those described above.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \cdots & h_{1N_T} \\ h_{21} & h_{22} & \cdots & h_{2N_T} \\ \vdots & & \ddots & \\ h_{i1} & h_{i2} & \cdots & h_{iN_T} \\ \vdots & & & \ddots \\ h_{N_R1} & h_{N_R2} & \cdots & h_{N_RN_T} \end{bmatrix} \begin{bmatrix} x_1 \\ x_2 \\ \vdots \\ x_i \\ \vdots \\ x_{N_T} \end{bmatrix} + \begin{bmatrix} n_1 \\ n_2 \\ \vdots \\ n_i \\ \vdots \\ n_{N_R} \end{bmatrix} = \qquad [\text{Equation 10}]$$

$$Hx + n$$

Meanwhile, the number of rows and columns of the channel matrix H indicative of the state of channels is determined by the number of transmission/reception antennas. In the channel matrix H, as described above, the number of rows becomes equal to the number of reception antennas N_R, and the number of columns becomes equal to the number of transmission antennas N_T. That is, the channel matrix H becomes an N_R×N_T matrix.

In general, the rank of a matrix is defined as a minimum number of the number of independent rows or columns. Accordingly, the rank of the matrix is not greater than the number of rows or columns. As for figural style, for example, the rank H of the channel matrix H is limited as follows.

$$\text{rank}(H) \leq \min(N_T, N_R) \qquad [\text{Equation 11}]$$

Furthermore, if a matrix is subjected to Eigen value decomposition, a rank may be defined as the number of Eigen values that belong to Eigen values and that are not 0. Likewise, if a rank is subjected to Singular Value Decomposition (SVD), it may be defined as the number of singular values other than 0. Accordingly, the physical meaning of a rank in a channel matrix may be said to be a maximum number on which different information may be transmitted in a given channel.

In this specification, a "rank" for MIMO transmission indicates the number of paths through which signals may be independently transmitted at a specific point of time and a specific frequency resource. The "number of layers" indicates the number of signal streams transmitted through each path. In general, a rank has the same meaning as the number of layers unless otherwise described because a transmission end sends the number of layers corresponding to the number of ranks used in signal transmission.

Reference Signal (RS)

In a wireless communication system, a signal may be distorted during transmission because data is transmitted through a radio channel. In order for a reception end to accurately receive a distorted signal, the distortion of a received signal needs to be corrected using channel information. In order to detect channel information, a method of detecting channel information using the degree of the distortion of a signal transmission method and a signal known to both the transmission side and the reception side when they are transmitted through a channel is chiefly used. The aforementioned signal is called a pilot signal or reference signal (RS).

Furthermore recently, when most of mobile communication systems transmit a packet, they use a method capable of improving transmission/reception data efficiency by adopting multiple transmission antennas and multiple reception antennas instead of using one transmission antenna and one reception antenna used so far. When data is transmitted and received using multiple input/output antennas, a channel state between the transmission antenna and the reception antenna must be detected in order to accurately receive the signal. Accordingly, each transmission antenna must have an individual reference signal.

In a mobile communication system, an RS may be basically divided into two types depending on its object. There are an RS having an object of obtaining channel state information and an RS used for data demodulation. The former has an object of obtaining, by a UE, to obtain channel state information in the downlink. Accordingly, a corresponding RS must be transmitted in a wideband, and a UE must be capable of receiving and measuring the RS although the UE does not receive downlink data in a specific subframe. Furthermore, the former is also used for radio resources management (RRM) measurement, such as handover. The latter is an RS transmitted along with corresponding resources when an eNB transmits the downlink. A UE may perform channel estimation by receiving a corresponding RS and thus may demodulate data. The corresponding RS must be transmitted in a region in which data is transmitted.

A downlink RS includes one common RS (CRS) for the acquisition of information about a channel state shared by all of UEs within a cell and measurement, such as handover, and a dedicated RS (DRS) used for data demodulation for only a specific UE. Information for demodulation and channel measurement can be provided using such RSs. That is, the DRS is used for only data demodulation, and the CRS is used for the two objects of channel information acquisition and data demodulation.

The reception side (i.e., UE) measures a channel state based on a CRS and feeds an indicator related to channel quality, such as a channel quality indicator (CQI), a precoding matrix index (PMI) and/or a rank indicator (RI), back to the transmission side (i.e., an eNB). The CRS is also called a cell-specific RS. In contrast, a reference signal related to the feedback of channel state information (CSI) may be defined as a CSI-RS.

The DRS may be transmitted through resource elements if data on a PDSCH needs to be demodulated. A UE may receive information about whether a DRS is present through a higher layer, and the DRS is valid only if a corresponding PDSCH has been mapped. The DRS may also be called a UE-specific RS or demodulation RS (DMRS).

FIG. 7 illustrates reference signal patterns mapped to downlink resource block pairs in a wireless communication system to which the present invention may be applied.

Referring to FIG. 7, a downlink resource block pair, that is, a unit in which a reference signal is mapped, may be represented in the form of one subframe in a time domain X 12 subcarriers in a frequency domain. That is, in a time axis (an x axis), one resource block pair has a length of 14 OFDM symbols in the case of a normal cyclic prefix (CP) (FIG. 7a) and has a length of 12 OFDM symbols in the case of an extended cyclic prefix (CP) (FIG. 7b). In the resource block lattice, resource elements (REs) indicated by "0", "1", "2", and "3" mean the locations of the CRSs of antenna port indices "0", "1", "2", and "3", respectively, and REs indicated by "D" mean the location of a DRS.

A CRS is described in more detail below. The CRS is a reference signal which is used to estimate the channel of a physical antenna and may be received by all UEs located within a cell in common. The CRS is distributed to a full frequency bandwidth. That is, the CRS is cell-specific signal and is transmitted every subframe in a wideband. Furthermore, the CRS may be used for channel quality information (CSI) and data demodulation.

A CRS is defined in various formats depending on an antenna array on the transmitting side (eNB). In the 3GPP LTE system (e.g., Release-8), an RS for a maximum four antenna ports is transmitted depending on the number of transmission antennas of an eNB. The side from which a downlink signal is transmitted has three types of antenna arrays, such as a single transmission antenna, two transmission antennas and four transmission antennas. For example, if the number of transmission antennas of an eNB is two, CRSs for a No. 0 antenna port and a No. 1 antenna port are transmitted. If the number of transmission antennas of an eNB is four, CRSs for No. 0~No. 3 antenna ports are transmitted. If the number of transmission antennas of an eNB is four, a CRS pattern in one RB is shown in FIG. 7.

If an eNB uses a single transmission antenna, reference signals for a single antenna port are arrayed.

If an eNB uses two transmission antennas, reference signals for two transmission antenna ports are arrayed using a time division multiplexing (TDM) scheme and/or a frequency division multiplexing (FDM) scheme. That is, different time resources and/or different frequency resources are allocated in order to distinguish between reference signals for two antenna ports.

Furthermore, if an eNB uses four transmission antennas, reference signals for four transmission antenna ports are arrayed using the TDM and/or FDM schemes. Channel information measured by the reception side (i.e., UE) of a downlink signal may be used to demodulate data transmitted using a transmission scheme, such as single transmission antenna transmission, transmission diversity, closed-loop spatial multiplexing, open-loop spatial multiplexing ora multi-user-multi-input/output (MIMO) antenna.

If a multi-input multi-output antenna is supported, when a RS is transmitted by a specific antenna port, the RS is transmitted in the locations of resource elements specified depending on a pattern of the RS and is not transmitted in the locations of resource elements specified for other antenna ports. That is, RSs between different antennas do not overlap.

A DRS is described in more detail below. The DRS is used to demodulate data. In multi-input multi-output antenna transmission, precoding weight used for a specific UE is combined with a transmission channel transmitted by each transmission antenna when the UE receives an RS, and is used to estimate a corresponding channel without any change.

A 3GPP LTE system (e.g., Release-8) supports a maximum of four transmission antennas, and a DRS for rank 1 beamforming is defined. The DRS for rank 1 beamforming also indicates an RS for an antenna port index 5.

In an LTE-A system, that is, an advanced and developed form of the LTE system, the design is necessary to support a maximum of eight transmission antennas in the downlink of an eNB. Accordingly, RSs for the maximum of eight transmission antennas must be also supported. In the LTE system, only downlink RSs for a maximum of four antenna ports has been defined. Accordingly, if an eNB has four to a maximum of eight downlink transmission antennas in the LTE-A system, RSs for these antenna ports must be additionally defined and designed. Regarding the RSs for the maximum of eight transmission antenna ports, the aforementioned RS for channel measurement and the aforementioned RS for data demodulation must be designed.

One of important factors that must be considered in designing an LTE-A system is backward compatibility, that is, that an LTE UE must well operate even in the LTE-A system, which must be supported by the system. From an RS transmission viewpoint, in the time-frequency domain in which a CRS defined in LTE is transmitted in a full band every subframe, RSs for a maximum of eight transmission antenna ports must be additionally defined. In the LTE-A system, if an RS pattern for a maximum of eight transmission antennas is added in a full band every subframe using the same method as the CRS of the existing LTE, RS overhead is excessively increased.

Accordingly, the RS newly designed in the LTE-A system is basically divided into two types, which include an RS having a channel measurement object for the selection of MCS or a PMI (channel state information-RS or channel state indication-RS (CSI-RS)) and an RS for the demodulation of data transmitted through eight transmission antennas (data demodulation-RS (DM-RS)).

The CSI-RS for the channel measurement object is characterized in that it is designed for an object focused on channel measurement unlike the existing CRS used for objects for measurement, such as channel measurement and handover, and for data demodulation. Furthermore, the CSI-RS may also be used for an object for measurement, such as handover. The CSI-RS does not need to be transmitted every subframe unlike the CRS because it is transmitted for an object of obtaining information about a channel state. In order to reduce overhead of a CSI-RS, the CSI-RS is intermittently transmitted on the time axis.

For data demodulation, a DM-RS is dedicatedly transmitted to a UE scheduled in a corresponding time-frequency domain. That is, a DM-RS for a specific UE is transmitted only in a region in which the corresponding UE has been scheduled, that is, in the time-frequency domain in which data is received.

In the LTE-A system, a maximum of eight transmission antennas are supported in the downlink of an eNB. In the LTE-A system, if RSs for a maximum of eight transmission antennas are transmitted in a full band every subframe using the same method as the CRS in the existing LTE, RS overhead is excessively increased. Accordingly, in the LTE-A system, an RS has been separated into the CSI-RS of the CSI measurement object for the selection of MCS or a PMI and the DM-RS for data demodulation, and thus the two RSs have been added. The CSI-RS may also be used for an object, such as RRM measurement, but has been designed for a main object for the acquisition of CSI. The CSI-RS does not need to be transmitted every subframe because it is not used for data demodulation. Accordingly, in order to reduce overhead of the CSI-RS, the CSI-RS is intermittently transmitted on the time axis. That is, the CSI-RS has a period corresponding to a multiple of the integer of one subframe and may be periodically transmitted or transmitted in a specific transmission pattern. In this case, the period or pattern in which the CSI-RS is transmitted may be set by an eNB.

For data demodulation, a DM-RS is dedicatedly transmitted to a UE scheduled in a corresponding time-frequency domain. That is, a DM-RS for a specific UE is transmitted only in the region in which scheduling is performed for the corresponding UE, that is, only in the time-frequency domain in which data is received.

In order to measure a CSI-RS, a UE must be aware of information about the transmission subframe index of the CSI-RS for each CSI-RS antenna port of a cell to which the UE belongs, the location of a CSI-RS resource element (RE) time-frequency within a transmission subframe, and a CSI-RS sequence.

In the LTE-A system, an eNB has to transmit a CSI-RS for each of a maximum of eight antenna ports. Resources used for the CSI-RS transmission of different antenna ports must be orthogonal. When one eNB transmits CSI-RSs for different antenna ports, it may orthogonally allocate the resources according to the FDM/TDM scheme by mapping the CSI-RSs for the respective antenna ports to different REs. Alternatively, the CSI-RSs for different antenna ports may be transmitted according to the CDM scheme for mapping the CSI-RSs to pieces of code orthogonal to each other.

When an eNB notifies a UE belonging to the eNB of information on a CSI-RS, first, the eNB must notify the UE of information about a time-frequency in which a CSI-RS for each antenna port is mapped. Specifically, the information includes subframe numbers in which the CSI-RS is transmitted or a period in which the CSI-RS is transmitted, a subframe offset in which the CSI-RS is transmitted, an OFDM symbol number in which the CSI-RS RE of a specific antenna is transmitted, frequency spacing, and the offset or shift value of an RE in the frequency axis.

A CSI-RS is transmitted through one, two, four or eight antenna ports. Antenna ports used in this case are p=15, p=15, 16, p=15, . . . , 18, and p=15, . . . , 22, respectively. A CSI-RS may be defined for only a subcarrier interval $\Delta f=15$ kHz.

In a subframe configured for CSI-RS transmission, a CSI-RS sequence is mapped to a complex-valued modulation symbol a_k,l^(p) used as a reference symbol on each antenna port p as in Equation 12.

$$a_{k,l}^{(p)} = w_{l''} \cdot r_{l,n_s}(m') \quad \text{[Equation 12]}$$

$$k = k' + 12m +
\begin{cases}
-0 & \text{for } p \in \{15, 16\}, \text{ normal cyclic prefix} \\
-6 & \text{for } p \in \{17, 18\}, \text{ normal cyclic prefix} \\
-1 & \text{for } p \in \{19, 20\}, \text{ normal cyclic prefix} \\
-7 & \text{for } p \in \{21, 22\}, \text{ normal cyclic prefix} \\
-0 & \text{for } p \in \{15, 16\}, \text{ extended cyclic prefix} \\
-3 & \text{for } p \in \{17, 18\}, \text{ extended cyclic prefix} \\
-6 & \text{for } p \in \{19, 20\}, \text{ extended cyclic prefix} \\
-9 & \text{for } p \in \{21, 22\}, \text{ extended cyclic prefix}
\end{cases}$$

-continued $$l = l' + \begin{cases} l'' & \text{CSI reference signal configurations 0-19,} \\ & \text{normal cyclic prefix} \\ 2l'' & \text{CSI reference signal configurations 20-31,} \\ & \text{normal cyclic prefix} \\ l'' & \text{CSI reference signal configurations 0-27,} \\ & \text{extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

In Equation 12, (k',l') (wherein k' is a subcarrier index within a resource block and l' indicates an OFDM symbol index within a slot.) and the condition of n_s is determined depending on a CSI-RS configuration, such as Table 3 or Table 4.

Table 3 illustrates the mapping of (k',l') from a CSI-RS configuration in a normal CP.

TABLE 3

| | CSI reference signal configuration | Number of CSI reference signals configured | | | | | |
|---|---|---|---|---|---|---|---|
| | | 1 or 2 | | 4 | | 8 | |
| | | (k', l') | n_s mod 2 | (k', l') | n_s mod 2 | (k', l') | n_s mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame structure type 2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

Table 4 illustrates the mapping of (k',l') from a CSI-RS configuration in an extended CP.

TABLE 4

| CSI reference signal configuration | Number of CSI reference signals configured | | | | | |
|---|---|---|---|---|---|---|
| | 1 or 2 | | 4 | | 8 | |
| | (k', l') | $n_s$ mod 2 | (k', l') | $n_s$ mod 2 | (k', l') | $n_s$ mod 2 |
| Frame structure type 1 and 2 | | | | | | |
| 0 | (11, 4) | 0 | (11, 4) | 0 | (11, 4) | 0 |
| 1 | (9, 4) | 0 | (9, 4) | 0 | (9, 4) | 0 |
| 2 | (10, 4) | 1 | (10, 4) | 1 | (10, 4) | 1 |
| 3 | (9, 4) | 1 | (9, 4) | 1 | (9, 4) | 1 |
| 4 | (5, 4) | 0 | (5, 4) | 0 | | |
| 5 | (3, 4) | 0 | (3, 4) | 0 | | |
| 6 | (4, 4) | 1 | (4, 4) | 1 | | |
| 7 | (3, 4) | 1 | (3, 4) | 1 | | |
| 8 | (8, 4) | 0 | | | | |
| 9 | (6, 4) | 0 | | | | |
| 10 | (2, 4) | 0 | | | | |
| 11 | (0, 4) | 0 | | | | |
| 12 | (7, 4) | 1 | | | | |
| 13 | (6, 4) | 1 | | | | |
| 14 | (1, 4) | 1 | | | | |
| 15 | (0, 4) | 1 | | | | |
| Frame structure type 2 only | | | | | | |
| 16 | (11, 1) | 1 | (11, 1) | 1 | (11, 1) | 1 |
| 17 | (10, 1) | 1 | (10, 1) | 1 | (10, 1) | 1 |
| 18 | (9, 1) | 1 | (9, 1) | 1 | (9, 1) | 1 |
| 19 | (5, 1) | 1 | (5, 1) | 1 | | |
| 20 | (4, 1) | 1 | (4, 1) | 1 | | |
| 21 | (3, 1) | 1 | (3, 1) | 1 | | |
| 22 | (8, 1) | 1 | | | | |
| 23 | (7, 1) | 1 | | | | |
| 24 | (6, 1) | 1 | | | | |
| 25 | (2, 1) | 1 | | | | |
| 26 | (1, 1) | 1 | | | | |
| 27 | (0, 1) | 1 | | | | |

Referring to Table 3 and Table 4, in the transmission of a CSI-RS, in order to reduce inter-cell interference (ICI) in a multi-cell environment including a heterogeneous network (HetNet) environment, a maximum of 32 different configurations (in the case of a normal CP) or a maximum of 28 different configurations (in the case of an extended CP) are defined.

The CSI-RS configuration is different depending on the number of antenna ports and a CP within a cell, and a neighboring cell may have a maximum of different configurations. Furthermore, the CSI-RS configuration may be divided into a case where it is applied to both an FDD frame and a TDD frame and a case where it is applied to only a TDD frame depending on a frame structure.

(k',l') and n_s are determined depending on a CSI-RS configuration based on Table 3 and Table 4, and time-frequency resources used for CSI-RS transmission are determined depending on each CSI-RS antenna port.

FIG. 8 is a diagram illustrating resources to which reference signals are mapped in a wireless communication system to which the present invention may be applied.

FIG. 8(a) shows twenty types of CSI-RS configurations available for CSI-RS transmission by one or two CSI-RS antenna ports, FIG. 8(b) shows ten types of CSI-RS configurations available for four CSI-RS antenna ports, and FIG. 8(c) shows five types of CSI-RS configurations available for eight CSI-RS antenna ports.

As described above, radio resources (i.e., an RE pair) in which a CSI-RS is transmitted are determined depending on each CSI-RS configuration.

If one or two antenna ports are configured for CSI-RS transmission with respect to a specific cell, the CSI-RS is transmitted on radio resources on a configured CSI-RS configuration of the twenty types of CSI-RS configurations shown in FIG. 8(a).

Likewise, when four antenna ports are configured for CSI-RS transmission with respect to a specific cell, a CSI-RS is transmitted on radio resources on a configured CSI-RS configuration of the ten types of CSI-RS configurations shown in FIG. 8(b). Furthermore, when eight antenna ports are configured for CSI-RS transmission with respect to a specific cell, a CSI-RS is transmitted on radio resources on a configured CSI-RS configuration of the five types of CSI-RS configurations shown in FIG. 8(c).

A CSI-RS for each antenna port is subjected to CDM for every two antenna ports (i.e., {15,16}, {17,18}, {19,20} and {21,22}) on the same radio resources and transmitted. For example, in the case of antenna ports 15 and 16, CSI-RS complex symbols for the respective antenna ports 15 and 16 are the same, but are multiplied by different types of orthogonal code (e.g., Walsh code) and mapped to the same radio resources. The complex symbol of the CSI-RS for the antenna port 15 is multiplied by [1, 1], and the complex symbol of the CSI-RS for the antenna port 16 is multiplied by [1 −1] and mapped to the same radio resources. The same is true of the antenna ports {17,18}, {19,20} and {21,22}.

A UE may detect a CSI-RS for a specific antenna port by multiplying code by which a transmitted symbol has been multiplied. That is, a transmitted symbol is multiplied by the code [1 1] multiplied in order to detect the CSI-RS for the antenna port 15, and a transmitted symbol is multiplied by the code [1 −1] multiplied in order to detect the CSI-RS for the antenna port 16.

Referring to FIGS. 8(a) to 8(c), in the case of the same CSI-RS configuration index, radio resources according to a CSI-RS configuration having a large number of antenna ports include radio resources having a small number of CSI-RS antenna ports. For example, in the case of a CSI-RS configuration 0, radio resources for the number of eight antenna ports include both radio resources for the number of four antenna ports and radio resources for the number of one or two antenna ports.

A plurality of CSI-RS configurations may be used in one cell. 0 or one CSI-RS configuration may be used for a non-zero power (NZP) CSI-RS, and 0 or several CSI-RS configurations may be used for a zero power (ZP) CSI-RS.

For each bit set to 1 in a zero-power (ZP) CSI-RS ('ZeroPowerCSI-RS') that is a bitmap of 16 bits configured by a high layer, a UE assumes zero transmission power in REs (except a case where an RE overlaps an RE assuming a NZP CSI-RS configured by a high layer) corresponding to the four CSI-RS columns of Table 3 and Table 4. The most significant bit (MSB) corresponds to the lowest CSI-RS configuration index, and next bits in the bitmap sequentially correspond to next CSI-RS configuration indices.

A CSI-RS is transmitted only in a downlink slot that satisfies the condition of (n_s mod 2) in Table 3 and Table 4 and a subframe that satisfies the CSI-RS subframe configurations.

In the case of the frame structure type 2 (TDD), a CSI-RS is not transmitted in a special subframe, a synchronization signal (SS), a subframe colliding against a PBCH or SystemInformationBlockType1 (SIB 1) Message transmission or a subframe configured to paging message transmission.

Furthermore, an RE in which a CSI-RS for any antenna port belonging to an antenna port set S (S={15}, S={15,16}, S={17,18}, S={19,20} or S={21,22}) is transmitted is not used for the transmission of a PDSCH or for the CSI-RS transmission of another antenna port.

Time-frequency resources used for CSI-RS transmission cannot be used for data transmission. Accordingly, data throughput is reduced as CSI-RS overhead is increased. By considering this, a CSI-RS is not configured to be transmitted every subframe, but is configured to be transmitted in each transmission period corresponding to a plurality of subframes. In this case, CSI-RS transmission overhead can be significantly reduced compared to a case where a CSI-RS is transmitted every subframe.

A subframe period (hereinafter referred to as a "CSI transmission period") T_CSI-RS and a subframe offset Δ_CSI-RS for CSI-RS transmission are shown in Table 5.

Table 5 illustrates CSI-RS subframe configurations.

TABLE 5

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$-5 |
| 15-34 | 20 | $I_{CSI-RS}$-15 |
| 35-74 | 40 | $I_{CSI-RS}$-35 |
| 75-154 | 80 | $I_{CSI-RS}$-75 |

Referring to Table 5, the CSI-RS transmission period T_CSI-RS and the subframe offset Δ_CSI-RS are determined depending on the CSI-RS subframe configuration I_CSI-RS.

The CSI-RS subframe configuration of Table 5 may be configured as one of the aforementioned 'SubframeConfig' field and 'zeroTxPowerSubframeConfig' field. The CSI-RS subframe configuration may be separately configured with respect to an NZP CSI-RS and a ZP CSI-RS.

A subframe including a CSI-RS satisfies Equation 13.

$$(10n_f + \lfloor n_s/2 \rfloor - \Delta_{CSI-RS}) \mod T_{CSI-RS} = 0 \quad \text{[Equation 13]}$$

In Equation 13, T_CSI-RS means a CSI-RS transmission period, Δ_CSI-RS means a subframe offset value, n_f means a system frame number, and n_s means a slot number.

In the case of a UE configured in the transmission mode 9 with respect to a serving cell, one CSI-RS resource configuration may be configured for the UE. In the case of a UE configured in the transmission mode 10 with respect to a serving cell, one or more CSI-RS resource configuration(s) may be configured for the UE.

In the current LTE standard, a CSI-RS configuration includes an antenna port number (antennaPortsCount), a subframe configuration (subframeConfig), and a resource configuration (resourceConfig). Accordingly, the a CSI-RS configuration provides notification that a CSI-RS is transmitted how many antenna port, provides notification of the period and offset of a subframe in which a CSI-RS will be transmitted, and provides notification that a CSI-RS is transmitted in which RE location (i.e., a frequency and OFDM symbol index) in a corresponding subframe.

Specifically, the following parameters for each CSI-RS (resource) configuration are configured through high layer signaling.

If the transmission mode 10 has been configured, a CSI-RS resource configuration identifier A CSI-RS port number (antennaPortsCount): a parameter (e.g., one CSI-RS port, two CSI-RS ports, four CSI-RS ports or eight CSI-RS ports) indicative of the number of antenna ports used for CSI-RS transmission A CSI-RS configuration (resourceConfig) (refer to Table 3 and Table 4): a parameter regarding a CSI-RS allocation resource location A CSI-RS subframe configuration (subframeConfig, that is, I_CSI-RS) (refer to Table 5): a parameter regarding the period and/or offset of a subframe in which a CSI-RS will be transmitted If the transmission mode 9 has been configured, transmission power P_C for CSI feedback: in relation to the assumption of a UE for reference PDSCH transmission power for feedback, when the UE derives CSI feedback and takes a value within a [−8, 15] dB range in a 1-dB step size, P_C is assumed to be the ratio of energy per resource element (EPRE) per PDSCH RE and a CSI-RS EPRE.

If the transmission mode 10 has been configured, transmission power P_C for CSI feedback with respect to each CSI process. If CSI subframe sets C_CSI,0 and C_CSI,1 are configured by a high layer with respect to a CSI process, P_C is configured for each CSI subframe set in the CSI process.

A pseudo-random sequence generator parameter n_ID

If the transmission mode 10 has been configured, a high layer parameter 'qcl-CRS-Info-r11' including a QCL scrambling identifier for a quasico-located (QCL) type B UE assumption (qcl-ScramblingIdentity-r11), a CRS port count (crs-PortsCount-r11), and an MBSFN subframe configuration list (mbsfn-SubframeConfigList-r11) parameter.

When a CSI feedback value derived by a UE has a value within the [−8, 15] dB range, P_C is assumed to be the ration of PDSCH EPRE to CSI-RS EPRE. In this case, the PDSCH EPRE corresponds to a symbol in which the ratio of PDSCH EPRE to CRS EPRE is p_A.

A CSI-RS and a PMCH are not configured in the same subframe of a serving cell at the same time.

In the frame structure type 2, if four CRS antenna ports have been configured, a CSI-RS configuration index belonging to the [20-31] set (refer to Table 3) in the case of a normal CP or a CSI-RS configuration index belonging to the [16-27] set (refer to Table 4) in the case of an extended CP is not configured in a UE.

A UE may assume that the CSI-RS antenna port of a CSI-RS resource configuration has a QCL relation with delay spread, Doppler spread, Doppler shift, an average gain and average delay.

A UE for which the transmission mode 10 and the QCL type B have been configured may assume that antenna ports 0-3 corresponding to a CSI-RS resource configuration and antenna ports 15-22 corresponding to a CSI-RS resource configuration have QCL relation with Doppler spread and Doppler shift.

In the case of a UE configured in the transmission modes 1-9, one ZP CSI-RS resource configuration may be configured in the UE with respect to a serving cell. In the case of a UE configured in the transmission mode 10, one or more ZP CSI-RS resource configurations may be configured in the UE with respect to a serving cell.

The following parameters for a ZP CSI-RS resource configuration may be configured through high layer signaling.

The ZP CSI-RS configuration list (zeroTxPowerResourceConfigList) (refer to Table 3 and Table 4): a parameter regarding a zero-power CSI-RS configuration The ZP CSI-RS subframe configuration (eroTxPowerSubframeConfig, that is, I_CSI-RS) (refer to Table 5): a parameter regarding the period and/or offset of a subframe in which a zero-power CSI-RS is transmitted A ZP CSI-RS and a PMCH are not configured in the same subframe of a serving cell at the same time.

In the case of a UE configured in the transmission mode 10, one or more channel state information-interference measurement (CSI-IM) resource configurations may be configured in the UE with respect to a serving cell.

The following parameters for each CSI-IM resource configuration may be configured through high layer signaling.

The ZP CSI-RS configuration (refer to Table 3 and Table 4)

The ZP CSI RS subframe configuration I_CSI-RS (refer to Table 5)

A CSI-IM resource configuration is the same as any one of configured ZP CSI-RS resource configurations.

A CSI-IM resource and a PMCH are not configured within the same subframe of a serving cell at the same time.

Massive MIMO

A MIMO system having a plurality of antennas may be called a massive MIMO system and has been in the spotlight as means for improving spectrum efficiency, energy efficiency and processing complexity.

In recent 3GPP, in order to satisfy the requirements of spectrum efficiency for a future mobile communication system, a discussion about the massive MIMO system has started. The massive MIMO is also called full-dimension MIMO (FD-MIMO).

In a wireless communication system after LTE Release (Rel)-12, the introduction of an active antenna system (AAS) is considered.

Unlike the existing passive antenna system in which an amplifier and antenna capable of adjusting the phase and size of a signal have been separated, the AAS means a system in which each antenna is configured to include an active element, such as an amplifier.

The AAS does not require a separate cable, connector and other hardware for connecting an amplifier and an antenna because the active antenna is used, and thus has a high efficiency characteristic in terms of energy and operating costs. In particular, the AAS enables an advanced MIMO technology, such as the formation of an accurate beam pattern or 3D beam pattern in which a beam direction and a beam width are considered because the AAS supports each electronic beam control method.

Due to the introduction of an advanced antenna system, such as the AAS, a massive MIMO structure having a plurality of input/output antennas and a multi-dimension antenna structure is also considered. For example, unlike in the existing straight type antenna array, if a two-dimensional (2D) antenna array is formed, a 3D beam pattern can be formed by the active antenna of the AAS.

FIG. 9 illustrates a 2D-AAS having 64 antenna elements in a wireless communication system to which the present invention may be applied.

FIG. 9 illustrates a common 2D antenna array. A case where N_t=N_v·N_h antennas has a square form as in FIG. 9 may be considered. In this case, N_h indicates the number of antenna columns in a horizontal direction, and N_v indicates the number of antenna rows in a vertical direction.

If the antenna array of such a 2D structure is used, radio waves can be controlled both in the vertical direction (elevation) and the horizontal direction (azimuth) so that a transmission beam can be controlled in the 3D space. A wavelength control mechanism of such a type may be called 3D beamforming.

FIG. 10 illustrates a system in which an eNB or UE has a plurality of transmission/reception antennas capable of forming a 3D beam based on the AAS in a wireless communication system to which the present invention may be applied.

FIG. 10 is a diagram of the aforementioned example and illustrates a 3D MIMO system using a 2D antenna array (i.e., 2D-AAS).

From the point of view of a transmission antenna, if a 3D beam pattern is used, a semi-static or dynamic beam can be formed in the vertical direction of the beam in addition to the horizontal direction. For example, an application, such as the formation of a sector in the vertical direction, may be considered.

Furthermore, from the point of view of a reception antenna, when a reception beam is formed using a massive reception antenna, a signal power rise effect according to an antenna array gain may be expected. Accordingly, in the case of the uplink, an eNB can receive a signal from a UE through a plurality of antennas. In this case, there is an advantage in that the UE can set its transmission power very low by considering the gain of the massive reception antenna in order to reduce an interference influence.

FIG. 11 illustrates a 2D antenna system having cross-polarizations in a wireless communication system to which the present invention may be applied.

A 2D planar antenna array model in which polarization is considered may be diagrammed as shown in FIG. 11.

Unlike the existing MIMO system according to a passive antenna, a system based on an active antenna can dynamically control the gain of an antenna element by applying weight to an active element (e.g., an amplifier) to which each antenna element has been attached (or included). The antenna system may be modeled in an antenna element level because a radiation pattern depends on the number of antenna elements and an antenna arrangement, such as antenna spacing.

An antenna array model, such as the example of FIG. 11, may be represented by (M, N, P). This corresponds to a parameter that characterizes an antenna array structure.

M indicates the number of antenna elements having the same polarization in each column (i.e., the vertical direction) (i.e., the number of antenna elements having a +45° slant in each column or the number of antenna elements having a −45° slant in each column).

N indicates the number of columns in the horizontal direction (i.e., the number of antenna elements in the horizontal direction).

P indicates the number of dimensions of polarization. P=2 in the case of cross-polarization as in the case of FIG. 11, or P=1 in the case of co-polarization.

An antenna port may be mapped to a physical antenna element. The antenna port may be defined by a reference signal related to a corresponding antenna port. For example, in the LTE system, the antenna port 0 may be related to a cell-specific reference signal (CRS), and the antenna port 6 may be related to a positioning reference signal (PRS).

For example, an antenna port and a physical antenna element may be mapped in a one-to-one manner. This may correspond to a case where a single cross-polarization antenna element is used for downlink MIMO or downlink transmit diversity. For example, the antenna port 0 is mapped to one physical antenna element, whereas the antenna port 1 may be mapped to the other physical antenna element. In this case, from the point of view of a UE, two types of downlink transmission are present. One is related to a reference signal for the antenna port 0, and the other is related to a reference signal for the antenna port 1.

For another example, a single antenna port may be mapped to multiple physical antenna elements. This may correspond to a case where a single antenna port is used for beamforming. In beamforming, multiple physical antenna elements are used, so downlink transmission may be directed toward a specific UE. In general, this may be achieved using an antenna array configured using multiple columns of multiple cross-polarization antenna elements. In this case, from the point of view of a UE, one type of downlink transmission generated from a single antenna port is present. One is related to a CRS for the antenna port 0, and the other is related to a CRS for the antenna port 1.

That is, an antenna port indicates downlink transmission from the point of view of a UE not actual downlink transmission from a physical antenna element by an eNB.

For another example, a plurality of antenna ports is used for downlink transmission, but each antenna port may be mapped to multiple physical antenna elements. This may correspond to a case where an antenna array is used for downlink MIMO or downlink diversity. For example, each of the antenna ports 0 and 1 may be mapped to multiple physical antenna elements. In this case, from the point of view of a UE, two types of downlink transmission. One is related to a reference signal for the antenna port 0, and the other is related to a reference signal for the antenna port 1.

In FD-MIMO, the MIMO precoding of a data stream may experience antenna port virtualization, transceiver unit (or a transmission and reception unit) (TXRU) virtualization, and an antenna element pattern.

In the antenna port virtualization, a stream on an antenna port is precoded on a TXRU. In the TXRU virtualization, a TXRU signal is precoded on an antenna element. In the antenna element pattern, a signal radiated by an antenna element may have a directional gain pattern.

In the existing transceiver modeling, a static one-to-one mapping between an antenna port and a TXRU is assumed, and a TXRU virtualization effect is joined into a static (TXRU) antenna pattern including the effects of the TXRU virtualization and the antenna element pattern.

The antenna port virtualization may be performed by a frequency-selective method. In LTE, an antenna port, together with a reference signal (or pilot), is defined. For example, for precoded data transmission on an antenna port, a DMRS is transmitted in the same bandwidth as a data signal, and both the DMRS and data are precoded by the same precoder (or the same TXRU virtualization precoding). For CSI measurement, a CSI-RS is transmitted through multiple antenna ports. In CSI-RS transmission, a precoder that characterizes mapping between a CSI-RS port and a TXRU may be designed in a unique matrix so that a UE can estimate a TXRU virtualization precoding matrix for a data precoding vector.

A TXRU virtualization method is discussed in 1D TXRU virtualization and 2D TXRU virtualization, which are described below with reference to the following drawing.

FIG. 12 illustrates a transceiver unit model in a wireless communication system to which the present invention may be applied.

In the 1D TXRU virtualization, M_TXRU TXRUs are related to M antenna elements configured in a single column antenna array having the same polarization.

In the 2D TXRU virtualization, a TXRU model configuration corresponding to the antenna array model configuration (M, N, P) of FIG. 11 may be represented by (M_TXRU, N, P). In this case, M_TXRU means the number of TXRUs present in the 2D same column and same polarization, and always satisfies M_TXRU≤M. That is, the total number of TXRUs is the same as M_TXRU×N×P.

A TXRU virtualization model may be divided into a TXRU virtualization model option-1: sub-array partition model as in FIG. 12(a) and a TXRU virtualization model option-2: full connection model as in FIG. 12(b) depending on a correlation between an antenna element and a TXRU.

Referring to FIG. 12(a), in the case of the sub-array partition model, an antenna element is partitioned into multiple antenna element groups, and each TXRU is connected to one of the groups.

Referring to FIG. 12(b), in the case of the full-connection model, the signals of multiple TXRUs are combined and transferred to a single antenna element (or the arrangement of antenna elements).

In FIG. 12, q is the transmission signal vectors of antenna elements having M co-polarizations within one column. W is a wideband TXRU virtualization vector, and W is a wideband TXRU virtualization matrix. X is the signal vectors of M_TXRU TXRUs.

In this case, mapping between an antenna port and TXRUs may be one-to-one or one-to-many.

In FIG. 12, mapping between a TXRU and an antenna element (TXRU-to-element mapping) shows one example, but the present invention is not limited thereto. From the point of view of hardware, the present invention may be identically applied to mapping between an TXRU and an antenna element which may be implemented in various forms.

Definition of Channel Quality Indicator (CQI)

For CQI reporting based on QPSK, 16QAM and 64QAM, CQI indexes and interpretation thereof are shown in Table 7. For CQI reporting based on QPSK, 16QAM, 64QAM and 256QAM, CQI indexes and interpretation thereof are shown in Table 8.

A UE derives each CQI value reported in an uplink subframe n on the basis of an unlimited observation interval in the time and frequency domains. Here, the UE derives a highest CQI index that satisfies the following condition among CQI indexes 1 to 15 defined in Table 7 or 8 or derives CQI index 0 when CQI index 1 does not satisfy the following condition.

A combination of a modulation scheme and a transport block size corresponding to a CQI index can be applied, and a single PDSCH transport block that occupies a group of physical resource blocks referred to as CSI reference resources can be received with a transport block error probability that does not exceed 0.1.

When CSI subframe sets C_CSI,0 and C_CSI,1 are set by a higher layer, each CSI reference resource belongs to C_CSI,0 or C_CSI,1 but does not belong to both. When the CSI subframe sets C_CSI,0 and C_CSI,1 are set by the higher layer, the UE does not expect to receive a trigger for CSI reference resources in a subframe that does not belong to any subframe set. In the case of UEs configured in transmission mode 10 and a periodic CSI report, CSI subframe sets for CSI reference resources are set by the higher layer per CSI process.

In the case of UEs configured in transmission mode 9, when a parameter pmi-RI-Report is set by the higher layer, the UEs derive channel measurement in order to calculate a CQI value reported in an uplink subframe n on the basis of only a CSI-RS configured to assume non-zero power. When the parameter pmi-RI-Report is not set by the higher layer for UEs configured in transmission mode 9 or in the case of UEs configured in transmission modes 1 to 8, UEs derive channel measurement in order to calculate a CQI on the basis of CRS.

UEs configured in transmission mode 10 derive channel measurement in order to calculate a CQI value which corresponds to a CSI process and is reported in the uplink subframe n on the basis of only a non-zero power CSI-RS in CSI-RS resources configured in association with the CSI process.

UEs configured in transmission mode 10 derive interference measurement in order to calculate a CQI value which corresponds to a CSI process and is reported in uplink subframe n on the basis of only CSI-IM resources configured in association with the CSI process. When CSI subframe sets C_CSI,0 and C_CSI,1 for a CSI process are set by the higher layer for UEs configured in transmission mode 10, CSI-IM resources configured in a subframe subset belonging to CSI reference resources are used to derive interference measurement. In the case of a UE for which a parameter EIMTA-MainConfigServCell-r12 is set for a serving cell, CSI-IM resources configured only in downlink subframes of a radio frame indicated by a UL/DL configuration of the serving cell can be used to derive interference measurement.

When at least one of the following conditions is satisfied, combinations of modulation schemes and transport block sizes correspond to a CQI index.

Combinations of modulation schemes and transport block size are signaled for transmission of a PDSCH in CSI reference resources according to a related transport block size table.

A modulation scheme is indicated by the CQI index.

When combinations of transport block sizes and modulation schemes are applied to reference resources, a result of an effective channel code rate closest to a code rate indicated by the CQI index is obtained. If a result of an effective channel code rate closest to the code rate indicated by the CQI index is obtained with respect to one or more combinations of transport block sizes and modulation schemes, a combination having a smallest transport block size is associated.

CSI reference resources in a serving cell are defined as follows.

CSI reference resources are defined as a group of downlink resource blocks corresponding to a band associated with a derived CQI value in the frequency domain.

CSI reference resources are defined in the time domain as follows.

In the case of UEs configured in transmission modes 1 to 9 or UEs configured in transmission mode 10 in which a single CSI process is set for a serving cell, CSI reference resources are defined as a single downlink or special subframe n-n_CQI_ref.

Here, n_CQI_ref is the smallest value among values equal to or greater than 4 such that the subframe n-n_CQI_ref corresponds to a valid downlink or special subframe in the case of periodic CSI reporting.

In aperiodic CSI reporting, n_CQI_ref is determined to be included in a valid downlink or special subframe in which a reference resource is the same as a CSI request in an uplink DCI format when a higher layer parameter csi-SubframePatternConfig-r12 is not set for UEs.

Further, n_CQI_ref equals 4 and the subframe n-n_CQI_ref corresponds to a valid downlink or special subframe. Here, the subframe n-n_CQI_ref is received after a subframe carrying the corresponding CSI request in a random access response grant.

In aperiodic CSI reporting, when the higher layer parameter csi-SubframePatternConfig-r12 is set for UEs, CSI reference resources are determined as follows.

In the case of UEs configured in transmission modes 1 to 9, n_CQI_ref is a smallest value among values equal to or greater than 4 and the subframe n-n_CQI_ref corresponds to a valid downlink or special subframe. Here, the subframe n-n_CQI_ref is received in a subframe carrying a corresponding CSI request in the uplink DCI format or after the subframe.

Alternatively, n_CQI_ref is a smallest value among values equal to or greater than 4 and the subframe n-n_CQI_ref corresponds to a valid downlink or special subframe. Here, the subframe n-n_CQI_ref is received after a subframe carrying the corresponding CSI request in a random access response grant.

Alternatively, when there is no valid value for n_CQI_ref under the aforementioned condition, n_CQI_ref is determined as a smallest value such that reference resources are included in a valid downlink or special subframe n-n_CQI ref prior to a subframe carrying the corresponding CSI request. Here, the subframe n-n_CQI_ref is a valid downlink or special subframe having a smallest index in a radio frame.

In the case of UEs configured in transmission modes 1 to 9, the subframe n-n_CQI_ref corresponds to a valid downlink or special subframe, and n_CQI_ref is a smallest value among values equal to or greater than 4 such that the corresponding CSI request is included in the downlink DCI format.

Alternatively, n_CQI_ref is a smallest value among values equal to or greater than 4 and the subframe n-n_CQI_ref corresponds to a valid downlink or special subframe. Here, the subframe n-n_CQI_ref is received after the subframe carrying the corresponding CSI response in the random access response grant.

In the case of UEs configured in transmission mode 10 in which multiple CSI processes are set for the serving cell, a CSI reference resource for a given CSI process is defined as a single downlink or special subframe n-n_CQI_ref.

Here, in the case of an FDD serving cell and a periodic or aperiodic CSI report, the subframe n-n_CQI_ref corresponds to a valid downlink or special subframe, and n_CQI_ref is a smallest value among values equal to or greater than 5 such that the corresponding CSI request is included in the downlink DCI format in an aperiodic CSI report.

In the case of an FDD serving cell and an aperiodic CSI report, n_CQI_ref is 5 and the subframe n-n_CQI_ref corresponds to a valid downlink or special subframe. Here, the subframe n-n_CQI_ref is received after the subframe carrying the corresponding CSI request in the random access response grant.

When a TDD service cell is used, 2 or 3 CSI processes are set and periodic or aperiodic CSI reporting is performed, the subframe n-n_CQI_ref corresponds to a valid downlink or special subframe, and n_CQI_ref is a smallest value among values equal to or greater than 4 such that the corresponding CSI request is included in the uplink DCI format in an aperiodic CSI report.

Further, when a TDD service cell is used, 2 or 3 CSI processes are set and aperiodic CSI reporting is performed, n_CQI_ref is 4 and the subframe n-n_CQI_ref corresponds to a valid downlink or special subframe. Here, the subframe n-n_CQI_ref is received after the subframe carrying the corresponding CSI request in the random access response grant.

When a TDD service cell is used, 4 CSI processes are set and periodic or aperiodic CSI reporting is performed, the subframe n-n_CQI_ref corresponds to a valid downlink or special subframe, and n_CQI_ref is a smallest value among values equal to or greater than 5 such that the corresponding CSI request is included in the uplink DCI format in an aperiodic CSI report.

Further, when a TDD service cell is used, 4 CSI processes are set and aperiodic CSI reporting is performed, n_CQI_ref is 5 and the subframe n-n_CQI_ref corresponds to a valid downlink or special subframe. Here, the subframe n-n_CQI_ref is received after the subframe carrying the corresponding CSI request in the random access response grant.

A subframe in a serving cell is regarded as a valid downlink or special subframe when at least one of the following conditions is satisfied.

A subframe is set as a downlink subframe or a special subframe for a corresponding UE.

A subframe in a primary cell is a downlink subframe or a special subframe having a length of DwPTS greater than 7680*T_S when multiple cells having different uplink-downlink configurations are combined and the UE is incapable of simultaneously performing reception and transmission in the combined cell.

A subframe is not an MBSFN subframe in transmission modes other than transmission 9 or 10.

A subframe does not include a DwPTS field when the length of DwPTS is less than 7680*T_S.

In a periodic CSI report, a subframe is an element of a CSI subframe set linked to the periodic CSI report when CSI subframe sets are configured for the UE.

When multiple CSI processes are set, a UE is configured in transmission mode 10, and aperiodic CSI reporting is performed for the CSI processes, a subframe is an element of a CSI subframe set linked to a downlink or special subframe carrying a corresponding CSI request in an uplink DCI format when CSI subframe sets are configured for the CSI processes and the higher layer parameter csi-SubframePatternConfig-r12 is not set with respect to the UE.

In the case of a UE configured in transmission modes 1 to 9, a subframe is an element of a CSI subframe set related to a corresponding CSI request in the uplink DCI format when CSI subframe sets are configured by the higher layer parameter csi-SubframePatternConfig-r12 for the UE in aperiodic CSI reporting.

In the case of a UE configured in transmission mode 10, a subframe is an element of a CSI subframe set related to a corresponding CSI request in the uplink DCI format when CSI subframe sets are configured by the higher layer parameter csi-SubframePatternConfig-r12 for a CSI process with respect to the UE in aperiodic CSI reporting for the CSI process.

If there is no valid downlink or special subframe for CSI reference resources in a serving cell, a CSI report for the serving cell in an uplink subframe n is skipped.

In a layer domain, CSI reference resources are defined by an RI and a PMI that affect determination of a CQI.

In CSI reference resources, a UE assumes the following in order to derive a CQI index (and a PMI and an RI when the CQI index is set).

First three OFDM symbols are occupied by control signaling.

There is no resource element used by a primary or secondary synchronization signal, a PBCH or an EPDCCH.

CP length of a non-MBSFN subframe

Redundancy version 0

In the case of CSI reporting in the transmission mode 9, a UE assumes the following.

CRS REs are present in a non-MBSFN subframe.

When the UE is configured to report a PMI/RI, UE-specific reference signal overhead corresponds to a most recently reported rank when one or more CSI-RS ports are set and corresponds to rank-1 transmission when only a single CSI-RS port is set. In addition, a PDSCH signal on antenna ports $\{7, \ldots, 6+v\}$ for v layer brings about an equivalent signal of a symbol transmitted through antenna ports $\{15, \ldots, 14+P\}$, as represented by Equation 14.

$$\begin{bmatrix} y^{(15)}(i) \\ \vdots \\ y^{(14+P)}(i) \end{bmatrix} = W(i) \begin{bmatrix} x^{(0)}(i) \\ \vdots \\ x^{(v-1)}(i) \end{bmatrix} \qquad \text{[Equation 14]}$$

Here, $x(i)=[x^{(0)}(i) \ldots x^{(u-1)}(i)]^T$ is a vector of symbols derived through layer mapping. $P \in \{1,2,4,8\}$ is the number of set CSI-RS ports. If only a single CSI-RS port is set, W(i) is 1, and it not, W(i) is a precoding matrix corresponding to a reported PMI applicable to x(i).

In the case of CSI reporting in transmission mode 10, a UE assumes the following when a CSI process is set without PMI/RI reporting.

If the number of antenna ports of related CSI-RS resources is 1, a PDSCH is transmitted through a single antenna port, port 7. At antenna port $\{7\}$, channels are derived from channels at antenna port $\{15\}$ of related CSI-RS resources. CRS REs correspond to non-MBSFN subframe. CRS overhead is assumed to be the same as CRS overhead corresponding to the number of CRS antenna ports of a serving cell. UE-specific reference signal overhead is 12 REs per physical resource block (RPB).

If not, a PDSCH transmission scheme assumes the transmit diversity scheme at antenna ports $\{0, 1\}$ except that channels of antenna ports $\{0, 1\}$ are respectively derived from channels of antenna ports {15, 16} of related CSI resources when the number of antenna ports of related CSI-RS resources is 2. When the number of antenna ports of related CSI-RS resources is 4, the PDSCH transmission scheme assumes the transmit diversity scheme at antenna ports {0, 1, 2, 3} except that channels of antenna ports {0, 1, 2, 3} are respectively derived from channels of antenna ports {15, 16, 17, 18} of related CSI resources. The UE does not expect that 4 or more antenna ports are set for CSI-RS resources related to a CSI process set without PMI/RI reporting. CRS RE overhead is assumed to be the number of antenna ports corresponding to overhead of related CSI-RS resources. UE-specific reference signal overhead is zero.

In the case of CSI reporting in transmission mode 10, when a CSI process including PMI/RI reporting is set, a UE assumes the following.

CRS-REs are present in a non-MBSFN subframe.

CRS overhead is assumed to be the same as CRS overhead corresponding to the number of CRS antenna ports of a serving cell.

UE-specific reference signal overhead corresponds to a most recently reported rank when one or more CSI-RS ports are set and corresponds to rank-1 transmission when only a single CSI-RS port is set. In addition, a PDSCH signal on antenna ports {7, . . . , 6+v} for v layers brings about an equivalent signal of symbols transmitted on antenna ports {15, . . . , 14+P}, as represented by Equation 15.

$$\begin{bmatrix} y^{(15)}(i) \\ \vdots \\ y^{(14+P)}(i) \end{bmatrix} = W(i) \begin{bmatrix} x^{(0)}(i) \\ \vdots \\ x^{(v-1)}(i) \end{bmatrix}$$ [Equation 15]

Here, $x(i)=[x^{(0)}(i) \ldots x^{(u-1)}(i)]^T$ is a vector of symbols derived through layer mapping. $P \in \{1,2,4,8\}$ is the number of antenna ports of related CSI-RS resources. If P=1, W(i) is 1, and if not, W(i) is a precoding matrix corresponding to a reported PMI applicable to x(i).

There is no RE(s) allocated for a CSI-RS and a zero-power CSI-RS.

There is no RE(s) allocated for a PRS.

Table 6 shows PDSCH transmission schemes assumed for CSI reference resources.

TABLE 6

| Transmission mode | PDSCH transmission scheme |
|---|---|
| 1 | Single antennal port (port 0) |
| 2 | Transmit diversity |
| 3 | Transmission diversity when a related rank indicator is 1; and large delay CDD (Cyclic Delay Diversity) if not. |
| 4 | Closed-loop spatial multiplexing |
| 5 | Multi-user MIMO |
| 6 | Closed-loop spatial multiplexing with a single transport layer |
| 7 | Single antenna port (port 0) when the number of PBCH antenna ports is 1; and transmit diversity if not. |
| 8 | When a UE is configured not to report a PMI/RI: a single antenna port (port 0) if the number of PBCH antenna ports is 1; and transmit diversity if not. When the UE is configured to report a PMI/RI: closed-loop spatial multiplexing |
| 9 | When a UE is configured not to report a PMI/RI: a single antenna port (port 0) if the number of PBCH antenna ports is 1; and transmit diversity if not. |

TABLE 6-continued

| Transmission mode | PDSCH transmission scheme |
|---|---|
| 10 | When the UE is configured to report a PMI/RI: a single antenna port (port 7) if the number of CSI-RS ports is 1; and transmission using a maximum of 8 layers (ports 7 to 14) if not. When a CSI process of a UE is configured not to report a PMI/RI: a single antenna port (port 7) if the number of CSI-RS ports is 1; and transmit diversity if not. When the CSI process of the UE is configured to report a PMI/RI: a single antenna port (port 7) if the number of CSI-RS ports is 1; and transmission using a maximum of 8 layers (ports 7 to 14) if not. |

Table 7 is a 4-bit CQI table.

TABLE 7

| CQI index | Modulation | Code rate × 1024 | Efficiency |
|---|---|---|---|
| 0 | | Out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Table 8 is another 4-bit CQI table.

TABLE 8

| CQI index | Modulation | Code rate × 1024 | Efficiency |
|---|---|---|---|
| 0 | | Out of range | |
| 1 | QPSK | 78 | 0.1523 |
| 2 | QPSK | 193 | 0.3770 |
| 3 | QPSK | 449 | 0.8770 |
| 4 | 16QAM | 378 | 1.4766 |
| 5 | 16QAM | 490 | 1.9141 |
| 6 | 16QAM | 616 | 2.4063 |
| 7 | 64QAM | 466 | 2.7305 |
| 8 | 64QAM | 567 | 3.3223 |
| 9 | 64QAM | 666 | 3.9023 |
| 10 | 64QAM | 772 | 4.5234 |
| 11 | 64QAM | 873 | 5.1152 |
| 12 | 256QAM | 711 | 5.5547 |
| 13 | 256QAM | 797 | 6.2266 |
| 14 | 256QAM | 885 | 6.9141 |
| 15 | 256QAM | 948 | 7.4063 |

Measurement Interval Setting Method for CSI Derivation

The present invention proposes a method of configuring (particularly, restricting) a measurement interval for CSI acquisition in an environment in which multiple CSI-RS resources are configured and CSI measurement is performed, such as a beamformed CSI-RS based scheme in a MIMO system (e.g., FD-MIMO, massive MIMO, 2D AAS, etc.) having multiple antennas.

In 3GPP, enhancement of a beamformed CSI-RS based scheme of FD-MIMO is under discussion as follows.

This category comprises schemes where (at a given time/frequency resource) CSI-RS ports have narrow beam widths and hence not cell wide coverage, and (at least from the eNB perspective) at least some CSI-RS port-resource combinations have different beam directions.

In this category, some potential specification enhancements may include one or more of the following:

Measuring one or multiple beamformed CSI-RS resources. A resource can be a NZP CSI-RS resource, CSI-RS port(s), a CSI process, or a DRS Indicating selection of one or multiple resource(s)

Improvement of the definition of CSI process, CSI-RS resource, CSI and/or DRS.

To implement such schemes, a serving eNB can determine at least a part of beamforming weights from measuring UL signal(s) (applicable when DL-UL duplex distance is sufficiently small to allow reciprocity) or beamformed DRS measurements which are reported by one or more UEs. To assist beamforming weight determination at the eNB, DRS measurement and CSI-RS enhancements may be considered.

From the perspective of a serving eNB, beamformed CSI-RS resource can be controlled and allocated either cell-specifically or UE-specifically. Approaches for allocating beamformed CSI-RS resource(s) include and may not be limited to the following:

Approach 1, UE-specific beamforming on configured CSI-RS resource: In this approach, a serving eNB may dynamically change the beamforming weights applied on a NZP CSI-RS resource configured to a UE. To ensure that the UE resets the start time of a CSI measurement window when beamforming change occurs, the UE may explicitly or implicitly receive an indication from the eNB. Alternatively, the UE may be configured to always limit its NZP CSI-RS measurement window (e.g. to 1 subframe). An interference measurement window may also be used for CSI-IM measurements. Measurement resource restriction, for either or both of CSI-IM and CSI-RS, may apply in the frequency domain as well.

Approach 2, CSI-RS resource change for channel measurement: In this approach, a UE is configured with M(>1) NZP CSI-RS resources. From those M resources, the eNB selects N (>=1) resource(s) for a CSI process and signals the selected resources to the UE. Alternatively, UE reports N selected CSI-RS resource indices from M configured CSI-RS resources.

Approach 3, Aperiodic beamformed CSI-RS: In this approach, a UE is configured with a CSI process on which the actual NZP CSI-RS transmission and CSI-IM measurement instances are controlled by eNB and signaled to the UE. The measurement window can be configured by higher-layer signaling.

Approaches 1, 2, and 3 may be combined. Some of these approaches may be applicable to the existing schemes.

Several examples of schemes which fall under this category can be described as follows.

Scheme 1: In this scheme, a UE is configured with a single CSI process and a single NZP CSI-RS resource. CSI reporting is performed according to one of the following alternatives:

Selection of one or more beams along with quantized co-phasing between two polarization groups;

Quantized co-phasing between two dual polarized ports without beam selection. This alternative applies when a UE is configured with only one beam;

Weighted linear combination of beams and quantized co-phasing between two polarization groups;

Selection of one or more beams per layer and/or per polarization in conjunction with quantized co-phasing between two polarization groups;

Reporting PMI(s) corresponding to the selected vertical beam(s) along with the horizontal precoder within the selected beam(s);

Reporting PMI(s) corresponding to a codebook that may have non-constant modulus elements.

In an exemplary scheme, beams may be dynamic and UE-specific.

Scheme 2: In this scheme, similar to scheme 1, a UE is also configured with a single CSI process and a single NZP CSI-RS resource. In addition, this example is characterized by UE port selection. That is, a UE's CSI report is associated with a port selection. For instance, an index representing selection of port or a subset of ports, RI/CQI or PMI/RI/CQI based on a selected subset of ports can be reported. In this example, different ports belonging to the NZP CSI-RS resource may be beamformed differently.

Scheme 3: In this scheme, a UE is configured with a single CSI process and multiple NZP CSI-RS resources.

One alternative of this scheme performs selection of only one CSI-RS resource along with its associated reporting. In this case, multiple beamformed NZP CSI-RS resources are measured by a UE. Then the UE reports a beam index (BI) of a report of CSI, such as PMI/RI/CQI, based on the preferred NZP CSI-RS resource along with a single UE-preferred NZP CSI-RS resource.

Another alternative of this scheme performs selection of one or more CSI-RS resources along with its associated reporting. This alternative is the same as the first one except that the UE reports an indicator (for instance, BIs or a bitmap) which select one or more beamformed NZP CSI-RS resources. The number of selected resources can dynamically change. The UE also reports CSI, such as PMI(s)/RI(s)/CQI, based on selected NZP CSI-RS resource(s). Here, the CSI reporting includes either respective RI/PMI per NZP CSI-RS resource or a single CSI report for all the selected NZP CSI-RS resource(s).

Scheme 4: In this scheme, a UE is configured with multiple CSI processes with a single NZP CSI-RS resource for each CSI process. The UE selects one or more CSI processes and reports the associated CSI. Having been configured with multiple CSI processes, the UE selects one or more CSI processes based on its measurement on those CSI processes. CSI, such as CQI(s)/PMI(s)/RI(s), associated with the selected CSI process(es) along with an index (or indices) of the selected CSI process(es) is signaled.

Scheme 5: In this scheme, a two-step process which includes DRS selection and CSI-RS resource selection, along with their associated CSI reporting, is utilized. A UE measures multiple beamformed DRSs and reports a DRS index (DI) or a CSI-reference signal received power (CSI-RSRP) associated with the preferred DRS(s). Then a beamformed CSI-RS resource is UE-specifically configured based on the reported DI or CSI-RSRP. Based on this configured beamformed CSI-RS resource, a report of CSI, such as RI/PMI/CQI, is signaled.

Reducing CSI feedback payload size and/or restricting the set of beam directions in a UE-specific manner may be considered. Codebook subset restriction (CSR) configured in a UE-specific manner may be used for this purpose.

In addition, CSI reporting without PMI and/or RI may be considered for open-loop transmit diversity schemes.

Among the above-described three approaches and five schemes, scheme 3 is considered, for example. That is, a case in which one CSI process and multiple NZP CSI-RS resources are configured for a UE is considered.

In this case, the UE measures multiple beamformed NZP CSI-RS resources. Then, the UE reports the best (or preferred) resource and CSI (PMI/RI/CQI) or reports beam indexes and CSI (PMI/RI/CQI) corresponding to multiple resources.

Here, the UE measures NZP CSI-RS resources and averages the measured NZP CSI-RS resources in a specific (UE-specific) measurement window in order to report CSI. Accordingly, configuration of a measurement window is an important issue in terms of accuracy of measurement in UE implementation. Particularly, when a method in which different beamforming schemes are applied to CSI-RSs in the time domain and the beamformed CSI-RSs are transmitted is considered, measurement performance may be considerably deteriorated if the UE freely measures and averages the CSI-RSs.

Accordingly, the present invention proposes a method of controlling (configuring), by a network, a measurement window for a UE instead of an operation depending on free measurement window configuring of a UE according to conventional "U E's unrestricted observation".

In the following description of the present invention, "one-shot measurement" may refer to derivation of channel measurement based on an NZP CSI-RS resource or derivation of interference measurement based on a CSI-IM resource only in a single instance (e.g., one subframe) or preconfigured short window period in order to calculate a CQI.

When multiple NZP CSI-RS resources or multiple CSI-IM resources are configured in one CSI process, "one-shot measurement" may refer to derivation of channel measurement based on multiple NZP CSI-RS resources or derivation of interference measurement based on multiple CSI-IM resources only in a single instance (e.g., one subframe) or preconfigured short window period in order to calculate a CQI.

Further, "one-shot measurement" may refer to derivation of channel measurement based on an NZP CSI-RS resource or derivation of interference measurement based on a CSI-IM resource only in a single instance (e.g., one subframe) or preconfigured short window period in order to calculate a CQI.

1. An eNB may instruct a UE to disable a measurement averaging operation of measuring and averaging NZP CSI-RS resources configured per CSI process (e.g., one or more CSI processes). This may be referred to as channel measurement restriction information. For example, such indication (i.e., channel measurement restriction information) can be configured for the UE using higher layer signaling.

Here, the channel measurement restriction indication may be integrally configured for one or more NZP CSI-RS resources configured for the UE. When multiple CSI processes are configured for the UE, the channel measurement restriction indication may be integrally configured for one or more NZP CSI-RS resources configured per CSI process.

In this case, the UE may configure a measurement window in a single instance (e.g., one subframe) or a preconfigured short window period. In addition, the UE may perform "one-shot measurement" for CSI (PMI/RI/CQI) based on one or more NZP CSI-RS resources in the measurement window in a corresponding measurement subframe (i.e., one subframe or subframes included in the short window period) and report the CSI to the eNB.

A. In the case of aperiodic CIS-RS reporting, such a measurement subframe may be defined as a subframe in which an aperiodic CSI-RS request is received by the UE or configured for the UE. Alternatively, the measurement subframe may be defined as a subframe in which a most recent CSI-RS is transmitted before reception of a CSI-RS request or configured for the UE.

B. In the case of periodic CSI-RS reporting, the measurement subframe may be defined as a reference resource (i.e., CSI reference resource) instance according to periodic CSI-RS reporting operation or configured for the UE. Alternatively, the measurement subframe may be defined as a subframe in which a most recent CSI-RS is transmitted before the reference resource or configured for the UE.

i. When the UE is configured to perform feedback of a beam index (BI) (or the CSI-RS resource selection (i.e., CSI-RS resource indicator) along with CSI feedback, a BI feedback period may be configured to be equal to or longer than an RI feedback period.

Here, when the BI reporting period is longer than the RI feedback period, the UE can calculate the corresponding BI on the assumption that a reference resource (i.e., CSI reference resource) instance associated with the BI reporting instance or a subframe instance in which a most recent CSI-RS is transmitted prior to the reference resource instance is the measurement subframe in order to determine the BI. In addition, the UE may report an RI derived with respect to a CSI-RS resource corresponding to the reported BI in the following RI feedback instance. Further, the UE may calculate and report CSI (i.e., PMI and/or CQI) according to "one-shot measurement" upon assuming the previously reported BI and RI in following PMI and/or CQI feedback instances.

As described above, the measurement subframe can be defined as a subframe in which an aperiodic CSI-RS request is received by the UE or configured for the UE in the case of aperiodic CSI-RS reporting. Alternatively, the measurement subframe may be defined as a subframe in which a most recent CSI-RS is transmitted prior to reception of a CSI-RS request or configured for the UE.

In the case of periodic CSI-RS reporting, the measurement subframe may be defined as a reference resource (i.e., CSI reference resource) instance according to periodic CSI-RS reporting operation or configured for the UE. Alternatively, the measurement subframe may be defined as a subframe in which a most recent CSI-RS is transmitted before the reference resource or configured for the UE.

If a reporting instance of the BI is configured to be the same as a reporting instance of another piece of CSI (e.g., RI) (or a BI reporting period is configured to be the same as a reporting period of another piece of CSI) (e.g., BI and RI are jointly encoded), the UE may measure CSI-RSs corresponding to a "one-shot measurement" subframe instance, derive a BI and an RI together, and report the BI and the RI.

ii. When a BI and an RI are jointly encoded, the UE may simultaneously derive the BI and the RI.

2. Further, the eNB may instruct the UE to disable measurement averaging operation of measuring and averaging NZP CSI-RS resource(s) configured per CSI process (e.g., one or more CSI processes). For example, such indication (i.e., channel measurement restriction information) may be configured for the UE using higher layer signaling.

Here, channel measurement restriction indication may be independently configured per NZP CSI-RS resource configured for the UE. Alternatively, when multiple CSI processes are configured for the UE, channel measurement restriction indication may be independently configured for each NZP CSI-RS resource per CSI process.

In this case, the UE may configure a measurement window in a single instance (e.g., one subframe) or a preconfigured short window period only for specific NZP CSI-RS resource(s) to which the indication is applied (i.e., channel measurement restriction is indicated). In addition, the UE may independently perform "one-shot measurement" for CSI (PM/RI/CQI) in the corresponding measurement subframe and report the CSI to the eNB.

A. Here, some resource(s) among multiple NZP CSI-RS resources included in one CSI process may be configured such that "one-shot measurement" is not forced therefor. This case may correspond to a case in which the eNB does not intend to change a specific beam. More specifically, the case may correspond to a case in which a cell-specific beam is configured. In the case of CSI-RS resource(s) for which "one-shot measurement" is not configured, measurement averaging can be performed thereon for a longer time to obtain a more accurate CSI estimation value.

In the above description of the present invention, "one-shot measurement" restriction is configured for multiple resources integrally or independently in a case in which multiple CSI-RS resources are configured per process.

In the case of CSI-IM, similarly, "one-shot measurement" restriction may be configured for CSI-IM resources integrally or independently in a case in which multiple resources are configured per process (e.g., for the purpose of measuring different interferences for specific subframes in eIMTA (Enhanced Interference Mitigation & Traffic Adaptation)).

For example, such indication (i.e., interference measurement restriction indication) can be configured for the UE using higher layer signaling.

In this case, the UE may configure an interference measurement window in a single instance (e.g. one subframe) or a preconfigured short window period. Then, the UE may perform "one-shot measurement" on one or more CSI-IM resources with respect to interference corresponding to the interference measurement window in the corresponding measurement subframe (i.e., one subframe or subframes included in the short window period), and report a CQI derived using the interference to the eNB.

In the case of aperiodic CSI-RS reporting, as described above, the measurement subframe may be defined as a subframe in which an aperiodic CSI-RS request is received by the UE or configured for the UE. Alternatively, the measurement subframe may be defined as a subframe in which a most recent CSI-IM is transmitted prior to reception of a CSI-RS request or configured for the UE.

In the case of periodic CSI-RS reporting, the measurement subframe may be defined as a reference resource (i.e., CSI reference resource) instance according to periodic CSI-RS reporting operation or configured for the UE. Alternatively, the measurement subframe may be defined as a subframe in which a most recent CSI-IM is transmitted before the reference resource or configured for the UE.

When M CSI-RS resources and N CSI-IM resources are configured for one process, "one-shot measurement" restriction may be configured for M CSI-RS resources and N CSI-IM resources integrally or independently. In this case, the UE may select a combination having best CSI (PMI/RI/CQI) among M*N combinations of CSI-RS resources and CSI-IM resources (or indicated specific combinations of less than M*N) and report the selected combination to the eNB. Here, the UE may report the combination to the eNB using the corresponding combination index or bitmap. In addition, the UE may also report CSI derived when the selected combination is assumed to the eNB.

Although beamformed CSI-RS resources have been described as an example for convenience in the above description of the present invention, the present invention is not limited thereto.

That is, the method proposed by the present invention may be extended and applied to a non-precoded CSI-RS. In this case, if a long CSI-RS measurement window is configured and CSI is measured when the speed and location of a UE rapidly change and thus channel variation is severe, measurement performance may be deteriorated. Here, the eNB may configure "one-shot measurement" restriction for the UE to improve the performance. Further, "one-shot measurement" can be applied when the eNB excludes instances in which a CSI-RS is not transmitted from measurement averaging when the eNB intends to change actual CSI-RS transmission instances even in the case of non-precoded CSI-RS.

FIG. 13 is a diagram illustrating a method of transmitting/receiving channel state information according to an embodiment of the present invention.

Referring to FIG. 13, a UE receives interference measurement restriction information and/or channel measurement restriction information (S1301).

The interference measurement restriction information may be independently configured per CSI-IM resource configured for the UE or integrally configured for CSI-IM resources configured for the UE.

In addition, the channel measurement restriction information may be independently configured per NZP CSI-RS resource configured for the UE or integrally configured for NZP CSI-RS resources configured for the UE.

The UE derives interference measurement based on a CSI-IM resource of only one first subframe in order to calculate a CQI and/or derives channel measurement based on an NZP CSI-RS of CSI-RS resources of only one second subframe in order to calculate a CQI (S1302).

Here, the first subframe and the second subframe may be the same subframe or different subframes.

In the case of aperiodic CSI reporting, the first subframe and/or the second subframe may be subframes in which a CSI request from an eNB is transmitted to the UE.

In the case of periodic CSI reporting, the first subframe and/or the second subframe may be CSI reference resources (refer to the above-described "CQI definition") according to periodic CSI reporting operation.

Furthermore, in the case of periodic CSI reporting, when BI (or CRI) reporting is configured, a BI (or CRI) reporting period may be configured to be longer than an RI reporting period. In this case, when CRI reporting is configured for the UE, a CQI, a PMI and an RI may be derived under the condition (assumption) of the reported CRI.

Alternatively, when BI (or CRI) reporting is configured in the case of periodic CSI reporting, a BI (or CRI) reporting period may be configured to be the same as an RI reporting period. In this case, a CRI and an RI may be jointly encoded. In addition, the CRI and the RI may be derived together.

The UE reports channel state information (CSI) to the eNB (S1303).

Here, the CSI may include an RI, a CQI, a PMI and/or a BI (or CRI), and periodic CSI reporting or aperiodic CSI reporting may be performed as described above.

Particularly, the UE may calculate a CQI based on the channel measurement result and/or the interference measurement result in step S1302 and report the calculated CQI to the eNB.

General Apparatus to which the Present Invention May be Applied

FIG. 14 illustrates a block diagram of a wireless communication apparatus according to an embodiment of the present invention.

Referring to FIG. 14, the wireless communication system includes a base station (eNB) 1410 and a plurality of user equipments (UEs) 1420 located within the region of the eNB 1410.

The eNB 1410 includes a processor 1411, a memory 1412 and a radio frequency unit 1413. The processor 1411 implements the functions, processes and/or methods proposed in FIGS. 1 to 13 above. The layers of wireless interface protocol may be implemented by the processor 1411. The memory 1412 is connected to the processor 1411, and stores various types of information for driving the processor 1411. The RF unit 1413 is connected to the processor 1411, and transmits and/or receives radio signals.

The UE 1420 includes a processor 1421, a memory 1422 and a radio frequency unit 1423. The processor 1421 implements the functions, processes and/or methods proposed in FIGS. 1 to 13 above. The layers of wireless interface protocol may be implemented by the processor 1421. The memory 1422 is connected to the processor 1421, and stores various types of information for driving the processor 1421. The RF unit 1423 is connected to the processor 1421, and transmits and/or receives radio signals.

The memories 1412 and 1422 may be located interior or exterior of the processors 1411 and 1421, and may be connected to the processors 1411 and 1421 with well known means. In addition, the eNB 1410 and/or the UE 1420 may have a single antenna or multiple antennas.

The embodiments described so far are those of the elements and technical features being coupled in a predetermined form. So far as there is not any apparent mention, each of the elements and technical features should be considered to be selective. Each of the elements and technical features may be embodied without being coupled with other elements or technical features. In addition, it is also possible to construct the embodiments of the present invention by coupling a part of the elements and/or technical features. The order of operations described in the embodiments of the present invention may be changed. A part of elements or technical features in an embodiment may be included in another embodiment, or may be replaced by the elements and technical features that correspond to other embodiment. It is apparent to construct embodiment by combining claims that do not have explicit reference relation in the following claims, or to include the claims in a new claim set by an amendment after application.

The embodiments of the present invention may be implemented by various means, for example, hardware, firmware, software and the combination thereof. In the case of the hardware, an embodiment of the present invention may be implemented by one or more application specific integrated circuits (ASICs), digital signal processors (DSPs), digital signal processing devices (DSPDs), programmable logic devices (PLDs), field programmable gate arrays (FPGAs), a processor, a controller, a micro controller, a micro processor, and the like.

In the case of the implementation by the firmware or the software, an embodiment of the present invention may be implemented in a form such as a module, a procedure, a function, and so on that performs the functions or operations described so far. Software codes may be stored in the memory, and driven by the processor. The memory may be located interior or exterior to the processor, and may exchange data with the processor with various known means.

It will be understood to those skilled in the art that various modifications and variations can be made without departing from the essential features of the inventions. Therefore, the detailed description is not limited to the embodiments described above, but should be considered as examples. The scope of the present invention should be determined by reasonable interpretation of the attached claims, and all modification within the scope of equivalence should be included in the scope of the present invention.

INDUSTRIAL APPLICABILITY

Although the present invention has been described based on an example in which the present invention is applied to 3GPP LTE/LTE-A, the present invention is applicable to various wireless communication systems in addition to 3GPP LTE/LTE-A.

The invention claimed is:

1. A method for transmitting, by a user equipment (UE), a channel state information (CSI) report in a wireless communication system, the method comprising:
   receiving, from a base station, configuration information related to a measurement,
      wherein the configuration information includes (i) resource information related to a plurality of non-zero-power (NZP) channel state information reference (CSI-RS) resources and (ii) specific information related to whether to disable a specific operation of the UE related to the measurement;
   receiving, from the base station, one or more NZP CSI-RSs based on the resource information;
   performing the measurement based on (i) the one or more NZP CSI-RSs and (ii) specific information;
   transmitting, to the base station, a CSI report,
   based on that the specific operation of the UE related to the measurement is disabled based on the specific information:
   wherein based on that the CSI report is a periodic CSI report, the measurement is performed based on only a NZP CSI-RS most recently transmitted before a CSI reference resource among the one or more NZP CSI-RSs, and
   wherein based on that the CSI report an aperiodic CSI report, the measurement is performed based on only a NZP-CSI-RS most recently transmitted before receiving a request for the aperiodic CSI report among the one or more NZP CSI-RSs.

2. The method of claim 1, wherein the CSI report further includes a rank indicator (RI).

3. The method of claim 2,
   wherein the CSI report further includes a beam index (BI),
   wherein, when a period of a feedback for the information for the BI is longer than a period of a feedback for the RI, the method further comprising:
   calculating the BI on an assumption that a CSI reference resource instance associated with a BI reporting instance or a subframe instance in which a most recent CSI-RS is transmitted prior to the CSI reference resource instance is a measurement subframe in order to determine the BI.

4. The method of claim 2, wherein the CSI report further includes a beam index (BI), and
   wherein the BI and the RI are jointly encoded.

5. The method of claim 1, wherein based on that the CSI report is a periodic CSI report, a measurement interval during which the measurement is performed is determined as a subframe related to the NZP CSI-RS most recently transmitted before the CSI reference resource among the one or more NZP CSI-RSs, and wherein based on that the CSI report an aperiodic CSI report, a measurement interval during which the measurement is performed is determined as a subframe related to the NZP-CSI-RS most recently transmitted before receiving the request for the aperiodic CSI report among the one or more NZP CSI-RSs.

6. The method of claim 1, wherein based on that the specific operation of the UE related to the measurement is enabled based on the specific information:

wherein, for a periodic CSI report and an aperiodic CSI report, the measurement is performed based on all of the one or more NZP-CSI-RSs.

7. The method of claim 6, wherein based on that the CSI report is a periodic CSI report, a measurement interval related to the measurement which is performed based on only the NZP CSI-RS most recently transmitted before the CSI reference resource is shorter than a measurement interval related to the measurement which is performed based on all of the one or more NZP-CSI-RSs.

8. The method of claim 6, wherein based on that the CSI report an aperiodic CSI report, a measurement interval related to the measurement which is performed based on only the NZP-CSI-RS most recently transmitted before receiving the request for the aperiodic CSI report is shorter than a measurement interval related to the measurement which is performed based on all of the one or more NZP-CSI-RSs.

9. The method of claim 1, wherein whether to disable the specific operation related to the measurement is configured independently for each of the plurality of the NZP CSI-RS resources.

10. The method of claim 9, wherein the specific operation is disabled for some of the plurality of the NZP CSI-RS resources.

11. The method of claim 10, wherein based on that the CSI report is a periodic CSI report, the measurement which is performed based on only the NZP CSI-RS most recently transmitted before the CSI reference resource is applied to the some of the plurality of the NZP CSI-RS resources, and wherein based on that the CSI report an aperiodic CSI report, the measurement which is performed based on only the NZP-CSI-RS most recently transmitted before receiving the request for the aperiodic CSI report is applied to the some of the plurality of the NZP CSI-RS resources.

12. The method of claim 11 wherein the specific operation is enabled for remaining NZP CSI-RS resources other than the some of the plurality of the NZP CSI-RS resources.

13. The method of claim 12, wherein, for the remaining NZP CSI-RS resources, the measurement is performed based all of the one or more NZP-CSI-RSs for a periodic CSI report and an aperiodic CSI report.

14. The method of claim 1, wherein the specific operation is unrestricted observation.

15. The method of claim 1, wherein the measurement is at least one of a channel measurement or an interference measurement.

16. A user equipment (UE) for transmitting a channel state information (CSI) report in a wireless communication system, the UE comprising:

a transmitter for transmitting a radio signal;
a receiver for receiving the radio signal; and
a processor for controlling the transmitter and the receiver, wherein the processor is configured to:
receive, from a base station, configuration information related to a measurement,
wherein the configuration information includes (i) resource information related to a plurality of non-zero-power (NZP) channel state information reference (CSI-RS) resources and (ii) specific information related to whether to disable a specific operation of the UE related to the measurement;
receive, from the base station, one or more NZP CSI-RSs based on the resource information;
perform the measurement based on (i) the one or more NZP CSI-RSs and (ii) specific information;
transmit, to the base station, a CSI report,
based on that the specific operation of the UE related to the measurement is disabled based on the specific information:
wherein based on that the CSI report is a periodic CSI report, the measurement is performed based on only a NZP CSI-RS most recently transmitted before a CSI reference resource among the one or more NZP CSI-RSs, and
wherein based on that the CSI report an aperiodic CSI report, the measurement is performed based on only a NZP-CSI-RS most recently transmitted before receiving a request for the aperiodic CSI report among the one or more NZP CSI-RSs.

17. The UE of claim 16, wherein the CSI report includes a rank indicator (RI).

18. The UE of claim 17, wherein the CSI report further includes a beam index (BI),
wherein, when a period of a feedback for the information for the BI is longer than a period of a feedback for the RI, the processor is further configured to:
calculate the BI on an assumption that a CSI reference resource instance associated with a BI reporting instance or a subframe instance in which a most recent CSI-RS is transmitted prior to the CSI reference resource instance is a measurement subframe in order to determine the BI.

19. The UE of claim 17, wherein the CSI report further includes a beam index (BI), and
wherein the BI and the RI are jointly encoded.

* * * * *